United States Patent
Cheng

[19]

[11] Patent Number: 6,055,524
[45] Date of Patent: Apr. 25, 2000

[54] MODEL-FREE ADAPTIVE PROCESS CONTROL

[75] Inventor: George Shu-Xing Cheng, Folsom, Calif.

[73] Assignee: General Cybernation Group, Inc., Rancho Cordova, Calif.

[21] Appl. No.: 08/944,450

[22] Filed: Oct. 6, 1997

[51] Int. Cl.[7] .................................................. G06N 3/04
[52] U.S. Cl. ............................... 706/23; 706/14; 706/15
[58] Field of Search ............................. 706/23, 14, 15, 706/21

[56] References Cited

U.S. PATENT DOCUMENTS

| | | | |
|---|---|---|---|
| 5,040,134 | 8/1991 | Park .................................................. | 706/34 |
| 5,335,643 | 8/1994 | Abate et al. .................................... | 123/679 |
| 5,367,612 | 11/1994 | Bozich et al. ................................. | 706/23 |
| 5,394,322 | 2/1995 | Hansen ........................................... | 364/157 |
| 5,426,720 | 6/1995 | Bozich et al. ................................. | 706/23 |
| 5,513,098 | 4/1996 | Spall et al. ..................................... | 364/158 |
| 5,555,495 | 9/1996 | Bell et al. ...................................... | 364/158 |
| 5,673,367 | 9/1997 | Buckley .......................................... | 706/23 |
| 5,825,646 | 10/1998 | Keeler et al. .................................. | 364/164 |

OTHER PUBLICATIONS

Spall, James C. et al., Model Free Control Of General Discrete Time Systems, Proceedings of the 32nd Conference on Decision and Control, pp. 2792–2797. Dec. 1993.

Lewis, Frank L., Neural Network Control of Robot Manipulators, IEEE Expert, pp. 64–75, Jun. 1996.

*Primary Examiner*—Tariq R. Hafiz
*Assistant Examiner*—Wilbert L. Starks, Jr.
*Attorney, Agent, or Firm*—Harry G. Weissenberger

[57] ABSTRACT

A model-free adaptive controller is disclosed, which uses a dynamic artificial neural network with a learning algorithm to control any single-variable or multivariable open-loop stable, controllable, and consistently direct-acting or reverse-acting industrial process without requiring any manual tuning, quantitative knowledge of the process, or process identifiers. The need for process knowledge is avoided by substituting 1 for the actual sensitivity function $\partial y(t)/\partial u(t)$ of the process.

30 Claims, 13 Drawing Sheets

2x2 MFA Anti-Delay Controller

MODEL-FREE ADAPTIVE PROCESS CONTROL

FIELD OF THE INVENTION

The invention relates to industrial process control, and more particularly to a method and apparatus for adaptively controlling various simple to complex, single variable to multivariable process control systems without requiring process-specific controller design, process identification, quantitative knowledge of the process, or complicated manual tuning.

BACKGROUND OF THE INVENTION

The advent of information technology during the last decade has had a major impact on today's civilization. In the industrial process control world, the information revolution has brought about major changes. Intelligence, such as control algorithms existing in the current instrument layer, is moving up to the supervisory computer layer or moving down to the sensor/transmitter layer. It is the fieldbus, a digital communication networks for sensor, device, and field, that leads to this change. The benefits of using fieldbus technology may include, i.a., wiring savings, more flexible and powerful control implementation options, two-way maintenance and diagnostic information Thus, future process control systems will be implemented by fieldbus controllers and computers with a field bus connection. The conventional instrument layer including Distributed Control Systems (DCS) and Programmable Logic Controllers (PLC) will eventually disappear.

The fieldbus controller, as the name suggests, is a controller connected to the fieldbus and may be packaged inside a transmitter enclosure. Since, the fieldbus controller is installed in the field, not in the control room, it should be very robust and work continuously without attention. This kind of controller requires solid hardware, software, and control algorithm. Since the current conventional proportional-integral-derivative (PID) control algorithm requires manual tuning, it is not always a good solution for a fieldbus controller.

In the past few years, the quality, functionality, and reliability of personal computers (PCs) have improved substantially. With Microsoft's multitasking Windows NT operating system, a PC can be a reliable and feasible device for mission- critical applications such as controlling process loops directly.

Facing this major change, the traditional process control world is ill prepared. Decades-old control schemes such as PID are still commonly in use. On the factory floor, we frequently face complex control problems that require high level expertise to resolve. At the same time, ill-prepared operators typically run the processes day and night. This is a fact that is overlooked and cannot be discounted. It is thus desirable to provide control technology and products to ordinary operators that will allow them to easily and effectively control simple to complex processes.

The existing control technology in process control area is basically is follows:

1. PID Control

The most widely used industrial controller today is still the old PID controller. PID is simple, easy to implement, and requires no process model, but has major shortcomings. Firstly, PID works for the process that is basically linear, time-invariant, and may have only small or no dynamic changes. These conditions are too restrictive for many industrial processes. Secondly, PID has to be tuned right by the user; that is, its parameters have to be set properly based on the process dynamics. In real applications, tuning of a PID is often a frustrating experience. And last, PID cannot work effectively in controlling complex systems which are usually nonlinear, time-variant, coupled, and have parameter or structure uncertainties. On the factory floor, it is very common to see that many loops are left in the manual mode because the operators have trouble keeping the control loop running smoothly in the closed-loop automatic mode. Due to these shortcomings, many industrial control systems today suffer safety, quality, energy waste, and productivity problems by continuing to use PID control.

Some PID self-tuning methods have been developed to deal with PID tuning problems. Many commercial single loop controllers and distributed control systems are equipped with auto-tuning or self-tuning PID controllers. But their applications have met major obstacles. If the self-tuning is model based, it requires insertion of a bump in the closed-loop situation in order to find the process model on-line to re-tune the PID. Operators find this procedure uncomfortable. If the self-tuning is rule based, it is often difficult to distinguish between the effects of load disturbances and genuine changes in the process dynamics. The controller may thus overreact to a disturbance and create an unnecessary adaptation transition. In addition, in a rule based system, the reliability of the tuning may be questionable since there are no mature stability analysis methods available for the rule based systems. Therefore, experience has shown that many self-tuning PID controllers are being operated in the so called auto-tuning mode rather than in the continuous self-tuning mode. Auto-tuning is usually defined as a feature in which the PID parameters are calculated automatically based on a simplified process model that may be acquired in the open-loop situation.

2. Adaptive Control

An adaptive control system can be defined as a feedback control system intelligent enough to adjust its characteristics in a changing environment so as to operate in an optimal manner according to some specified criteria. In general, adaptive control systems have achieved great success in aircraft, missile, and spacecraft control applications. In industrial process control applications, however, the traditional adaptive control has not been very successful. The most credible achievement is just the above-described PID self-tuning scheme that is widely implemented in commercial products but not very well used or accepted by the user.

Traditional adaptive control methods, either model reference or self-tuning, usually require some kind of identification for the process dynamics. This Contributes to a number of fundamental problems such as the amount of off line training it may require, the tradeoff between the persistent excitation of signals for correct identification and the steady system response for control performance, the assumption of the process structure, the model convergence and system stability issues in real applications. In addition, traditional adaptive control methods assume the knowledge of the process structure. They have major difficulties in dealing with nonlinear, structure variant, or large time delayed processes 3. Robust Control Robust control is a controller design method that focuses on the reliability (robustness) of the control law. Robustness is usually defined as the minimum requirement a control system has to satisfy to be useful in a practical environment. Once the controller is designed, its parameters do not change and control performances are guaranteed. The robust control methods, either in time domain or frequency domain, usually assume the knowledge of process dynamics and its variation ranges. Some algorithms may not need a precise process model but then require some kind of off-line identification. The design of a robust control system is typically based on the worst case scenario, so that the system usually does not work at optimal status in sense of control performance under normal circumstances.

Robust control methods are well suited in applications where the control system stability and reliability are the top priorities, process dynamics are known, and variation ranges for uncertainties can be estimated. Aircraft and spacecraft controls are some examples of these systems. In process control applications, some control systems can also be designed with robust control methods. However, the design of a robust control system requires high level expertise. Once the design is done, the system works well. But on the other hand, the system has to be redesigned when upgrades or major modifications are required.

4. Predictive Control

Predictive control is probably the only advanced control method used successfully in industrial control applications so far. The essence of predictive control is based on three key elements: (1) predictive model, (2) optimization in range of a temporal window, and (3) feedback correction. These three steps are usually carried on continuously by computer programs on-line.

Predictive control is a control algorithm based on a predictive model of the process. The model is used to predict the future output based on the historical information of the process as well as the future input. It emphasizes the function of the model, not the structure of the model. Therefore, state equation, transfer function, and even step response or impulse response can be used as the predictive model. The predictive model has the capability of showing the future behavior of the system. Therefore, the designer can experiment with different control laws to see the resulting system output, by doing a computer simulation.

Predictive control is an algorithm of optimal control. It calculates fixture control action based on a penalty function or performance function. However, the optimization of predictive control is limited to a moving time interval and is carried on continuously on-line. The moving time interval is sometimes called a temporal window This is the key difference compared to traditional optimal control that uses a performance function to judge global optimization. This idea works well for complex systems with dynamic changes and uncertainties since there is no reason in this case to judge the optimization performance based on the full time range.

Predicative control is also an algorithm of feedback control. If there is a mismatch between the model and process, or if there is a control performance problem caused by the system uncertainties, the predictive control could compensate for the error or adjust the model parameters based on on-line identification.

Due to its essence of predictive control, the design of such a control system is very complicated and requires high level expertise although the predictive control system works well in controlling various complex process control systems. This expertise requirement appears to be the main reason why predictive control is not used as widely as it deserves to be.

5. Intelligent Control

Intelligent control is another major field in modern control technology. Although there are different definitions regarding intelligent control, it is referred to herein as a control paradigm that uses various artificial intelligence techniques, which may include the following methods: learning control, expert control, fuzzy control, and neural network control.

Learning control uses pattern recognition techniques to obtain the current status of the control loop; and then makes control decisions based on the loop status as well as the knowledge or experience stored previously. Since learning control is limited by its stored knowledge, its application has never been popular.

Expert control, based on the expert system technology, uses a knowledge base to make control decisions. The knowledge base is built by human expertise, system data acquired on-line, and inference machine designed. Since the knowledge in expert control is represented symbolically and is always in discrete format, it is suitable for solving decision making problems such as production planning, scheduling, and fault diagnosis. It is not suitable for continuous control problems.

Fuzzy control, unlike learning control and expert control, is built on mathematical foundations with fuzzy set theory. It represents knowledge or experience in good mathematical format so that process and system dynamic characteristics can be described by fuzzy sets and fuzzy relational functions. Control decisions can be generated based on the fuzzy sets and functions with rules. Although fuzzy control has great potential for solving complex control problems, its design procedure is complicated and requires a great deal of specialty. Also, fuzzy math does not belong to the Field of Mathematics since many basic mathematical operations do not exist. For instance, the inverse addition is not available in fuzzy math. Then, it is very difficult to solve a fuzzy equation, yet solving a differential equation is one of the basic practices in traditional control theory and applications. Therefore, lack of good mathematical tools is a fundamental problem for fuzzy control to overcome.

Neural network control is a control method using artificial neural networks. It has great potential since artificial neural networks are built on a firm mathematical foundation that includes versatile and well understood mathematical tools. Artificial neural networks are also used as a key element in the model-free adaptive controller of the present invention.

Generally speaking, by using most of the traditional adaptive control, robust control, predictive control, and intelligent control methods, the control system has to be designed with high level expertise to which average users do no have access. Due to the difficulty of implementing these methods, practical control of complex systems is very difficult and expensive.

A need thus exists for a general purpose advanced controller that can be used easily and effectively to control a wide variety of simple and complex systems. Such a controller should have good self learning and adaptation capabilities to cope with changes and uncertainties in the system. It should be based on the closed-loop real time input/output data and a qualitative knowledge of the system behavior only. Neither off-line identification nor precise knowledge of system dynamics should be required. In addition, the controller should not require complicated design procedures so that anyone can use it easily.

SUMMARY OF THE INVENTION

The present invention overcomes the limitations of the prior art by providing control systems using a model-free adaptive (MFA) controller. The MFA of this invention uses a dynamic block such as a neural network with time-delayed inputs to control any single-variable or multivariable open-loop stable, controllable, and consistently direct-acting or reverse-acting industrial process without the need for complex manual tuning or any identifiers or quantitative knowledge of the process. The invention accomplished this result by using a learning algorithm for the neural network, in which the sensitivity function factor ∂y(t)/∂u(t) is replaced by a non-zero arbitrary constant. Preferably, this constant is chosen as 1. In accordance with this invention, the MFA controller is also advantageous in cascade control and in controlling processes with long response delays.

DESCRIPTION OF THE PREFERRED EMBODIMENT

A. Single-variable Model-Free Adaptive Control

Figure 1:
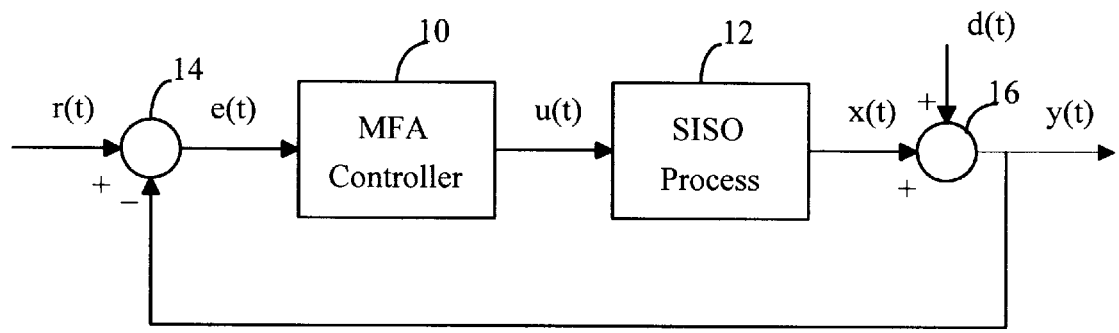
FIG. 1. is a block diagram illustrating a single-variable model-free adaptive control system according to this invention.

FIG. 1 illustrates a single variable model-free adaptive control system, which is the simplest form of this invention. The structure of the system is as simple as a traditional single loop control system, including a single-input-single-output (SISO) process 12, a controller 10, and signal adders, 14, 16. The signals shown in FIG. 1 are as follows:

r(t)—Setpoint
y(t)—Measured Variable or the Process Variable, y(t)=x(t)+d(t).
x(t)—Process Output
u(t)—Controller Output
d(t)—Disturbance, the disturbance caused by noise or load changes.
e(t)—Error between the Setpoint and Measured Variable, e(t)=r(t)−y(t).

Since the model-free adaptive control algorithm is an online adaptive algorithm, the control objective is to make the measured variable y(t) track the given trajectory of its setpoint r(t) under variations of setpoint, disturbance, and process dynamics. In other words, the task of the MFA controller is to minimize the error e(t) in an online fashion. Then we could select the objective function for MFA control system as $$E_S(t) = \frac{1}{2}e(t)^2 \qquad (1)$$

$$= \frac{1}{2}[r(t) - y(t)]^2$$

The minimization of $E_S(t)$ is done by adjusting the weights in the MFA controller.

Figure 2:
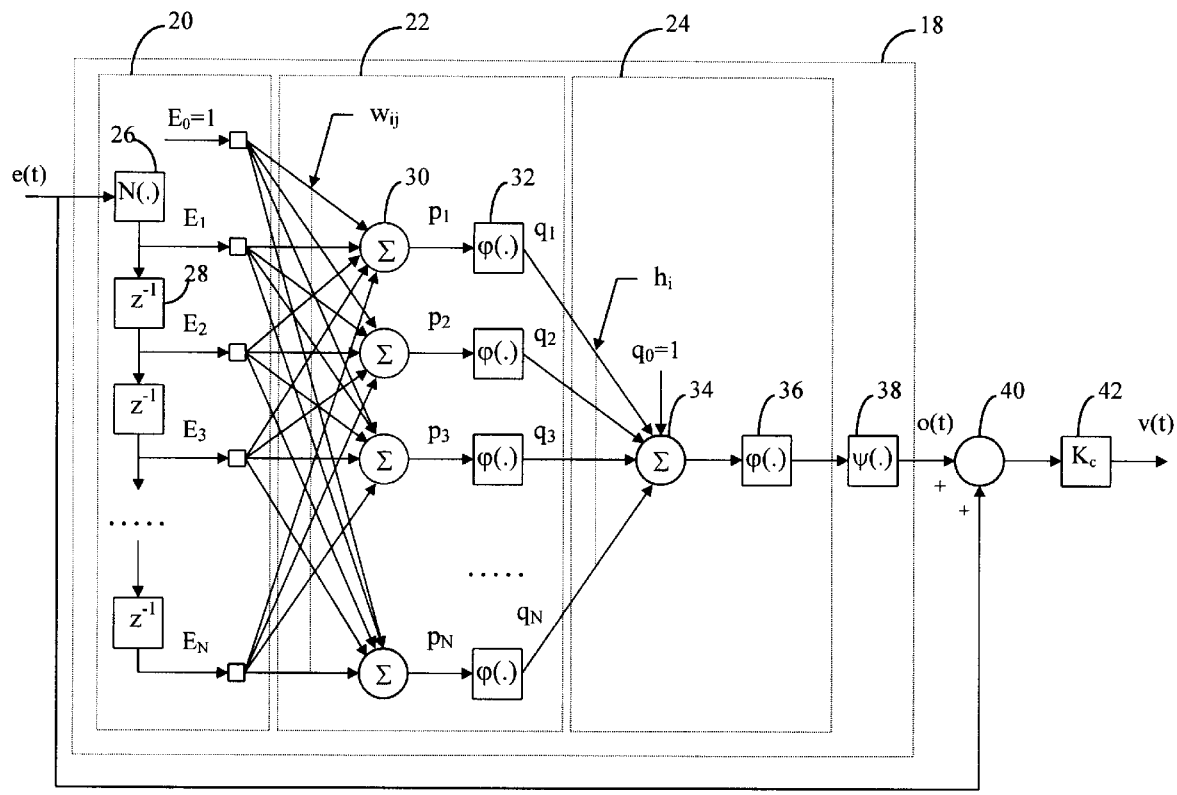
FIG. 2. is a block diagram illustrating the architecture of an single-variable model-free adaptive controller according to this invention.

FIG. 2 illustrates the architecture of a SISO MFA controller A multilayer perception (MLP) artificial neural network (ANN) 18 is adopted in the design of the controller. The ANN has one input layer 20, one hidden layer 22 with N neurons, and one output layer 24 with one neuron.

The input signal e(t) to the input layer 20 is converted to a normalized error signal $E_1$ with a range of −1 to 1 by using the normalization unit 26, where N(.) denotes a normalization function. The $E_1$ signal then goes through a series of delay units 28 iteratively, where $z^{-1}$ denotes the unit delay operator. A set of normalized error signals $E_2$ to $E_N$ is then generated. In this way, a continuous signal e(t) is converted to a series of discrete signals, which are used as the inputs to the ANN. These delayed error signals $E_i$, i=1, . . . N, are then conveyed to the hidden layer through the neural network connections. It is equivalent to adding a feedback structure to the neural network. Then the regular static multilayer perception becomes a dynamic neural network, which is a key component for the model-free adaptive controller.

A model-free adaptive controller requires a dynamic block such as a dynamic neural network as its key component. A dynamic block is just another name for a dynamic system, whose inputs and outputs have dynamic relationships.

Each input signal is conveyed separately to each of the neurons in the hidden layer 22 via a path weighted by an individual weighting factor $w_{ij}$, where i=1,2, . . . N, and j=1,2, . . . N. The inputs to each of the neurons in the hidden layer is summed by adder 30 with $E_0$=1, the threshold signal for the hidden layer, through the constant weights $W_{0j}$=1 to produce signal $p_j$. Then the signal $p_j$ is filtered by an activation function 32 to produce $q_j$, where j denotes the jth neuron in the hidden layer.

A sigmoidal function $\psi(.)$ mapping real numbers to (0,1) defined by $$\varphi(x) = \frac{1}{1+e^{-x}}, \qquad (2)$$

is used as the activation function in the ANN.

Each output signal from the hidden layer is conveyed to the single neuron in the output layer 24 via a path weighted by an individual weighting factor $h_i$, where i=1,2, ... N. These signals are summed in adder 34 with $h_0=1$, the threshold signal for the output layer, and then filtered by activation function 36. A function 38 defined by $$\psi(y) = \ln\frac{y}{1-y}, \qquad (3)$$

maps the range of the output layer from (0,1) back into the real space to produce the output o(t) of the artificial neural network 18.

The algorithm governing the input-output of the controller consists of the following difference equations:

$$p_j(n) = \sum_{i=1}^{N} w_{ij}(n)E_i(n) + 1, \qquad (4)$$

$$q_j(n) = \varphi(p_j(n)), \qquad (5)$$

$$o(n) = \psi\left[\varphi\left(\sum_{j=1}^{N} h_j(n)q_j(n) + 1\right)\right], \qquad (6)$$

$$= \sum_{j=1}^{N} h_j(n)q_j(n) + 1,$$

$$v(t) = K_c[o(t) + e(t)], \qquad (7)$$

where n denotes the nth iteration, o(t) is the continuous function of o(n), v(t) is the output of the model-free adaptive controller, $K_c>0$, called controller gain 42, is a constant used to adjust the magnitude of the controller. This constant is useful to fine tune the controller performance or keep the system in stable range.

An online learning algorithm is developed to continuously update the values of the weighting factors of the MFA controller as follows:

$$\Delta w_{ij}(n) = \eta K_c \frac{\partial y(n)}{\partial u(n)} e(n)q_j(n)(1-q_j(n))E_i(n)\sum_{k=1}^{N} h_k(n), \qquad (8)$$

$$\Delta h_j(n) = \eta K_c \frac{\partial y(n)}{\partial u(n)} e(n)q_j(n), \qquad (9)$$

where $\eta>0$ is the learning rate, and the partial derivative $\partial y(n)/\partial u(n)$ is tile gradient of y(t) with respect to u(t), which represents the sensitivity of the output y(t) to variations of the input u(t). It is convenient to define $$S_f(n) = \frac{\partial y(n)}{\partial u(n)}, \qquad (10)$$

as the sensitivity function of the process.

Since the process is unknown, the sensitivity function is also unknown. This is the classical "black box" problem that has to be resolved in order to make the algorithm useful.

Through the stability analysis of the model-free adaptive control, it was found that if the process under control is open-loop stable, controllable, and its acting type does not change during the whole period of control, bounding $S_f(n)$ with a set of arbitrary non-zero constants can guarantee the system to be bounded-input-bounded-output (BIBO) stable.

This study implies that the process sensitivity function $S_f(n)$ can be simply replaced by a constant; no special treatment for $S_f(n)$ or any detailed knowledge of the process are required in the learning algorithm of the model-free adaptive controller. By selecting $S_f(n)=1$, the resulting learning algorithm is as follows:

$$\Delta w_{ij}(n) = \eta K_c e(n)q_j(n)(1-q_j(n))E_i(n)\sum_{k=1}^{N} h_k(n), \qquad (11)$$

$$\Delta h_j(n) = \eta K_c e(n)q_j(n), \qquad (12)$$

The equations (1) through (12) work for both process direct-acting or reverse acting types. Direct-acting means that the increase of process input will cause its output to increase, and vice versa. Reverse-acting means that the increase of process input will cause its output to decrease, and vice versa. To keep the above equations working for both direct and reverse acting cases, e(t) needs to be calculated differently based on the acting type of the process as follows:

$$e(t)=r(t)-y(t), \text{ if direct acting} \qquad (13a)$$

$$e(t)=-[r(t)-y(t)], \text{ if direct acting} \qquad (13a)$$

This is a general treatment for the process acting types. It applies to all model-free adaptive controllers to be introduced later.

B. Multivariable Model-Free Adaptive Control

Figure 3:
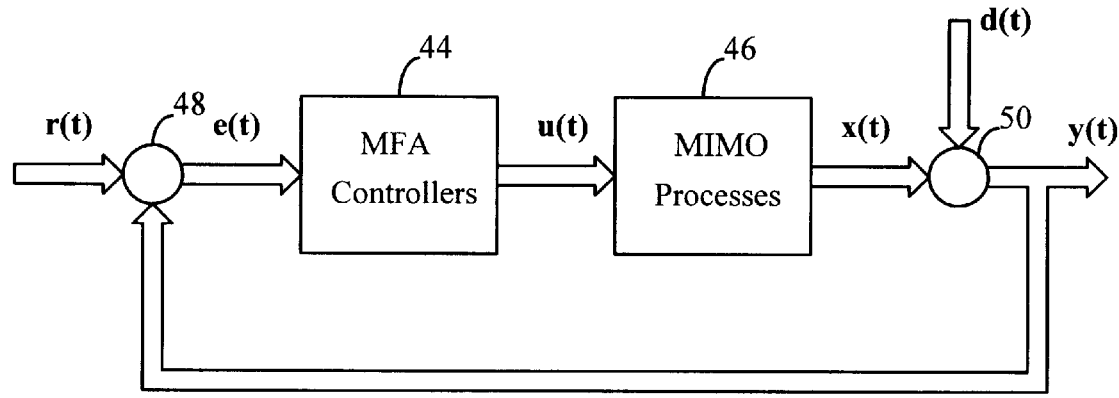
FIG. 3. is a block diagram illustrating a multivariable model-free adaptive control system according to this invention.

FIG. 3 illustrates a multivariable feedback control system with a model-free adaptive controller. The system includes a multi-input multi-output (MIMO) process 44, a set of controllers 46, and a set of signal adders 48 and 50, respectively for each control loop. The inputs e(t) to the controller are presented by comparing the setpoints r(t) with the measured variables y(t), which are the process responses to controller outputs u(t) and the disturbance signals d(t). Since it is a multivariable system, all the signals here are vectors represented in bold case as follows.

$$r(t)=[r_1(t), r_2(t), \ldots, r_N(t)]^T, \qquad (14a)$$

$$e(t)=[e_1(t), e_2(t), \ldots, e_N(t)]^T, \qquad (14b)$$

$$u(t)=[u_1(t), u_2(t), \ldots, u_N(t)]^T, \qquad (14c)$$

$$y(t)=[y_1(t), y_2(t), \ldots, y_N(t)]^T, \qquad (14d)$$

$$t(t)=[t_1(t), t_2(t), \ldots, t_N(t)]^T, \qquad (14e)$$

where superscript T denotes the transpose of the vector, and subscript N denotes the total element number of the vector.

Figure 4:
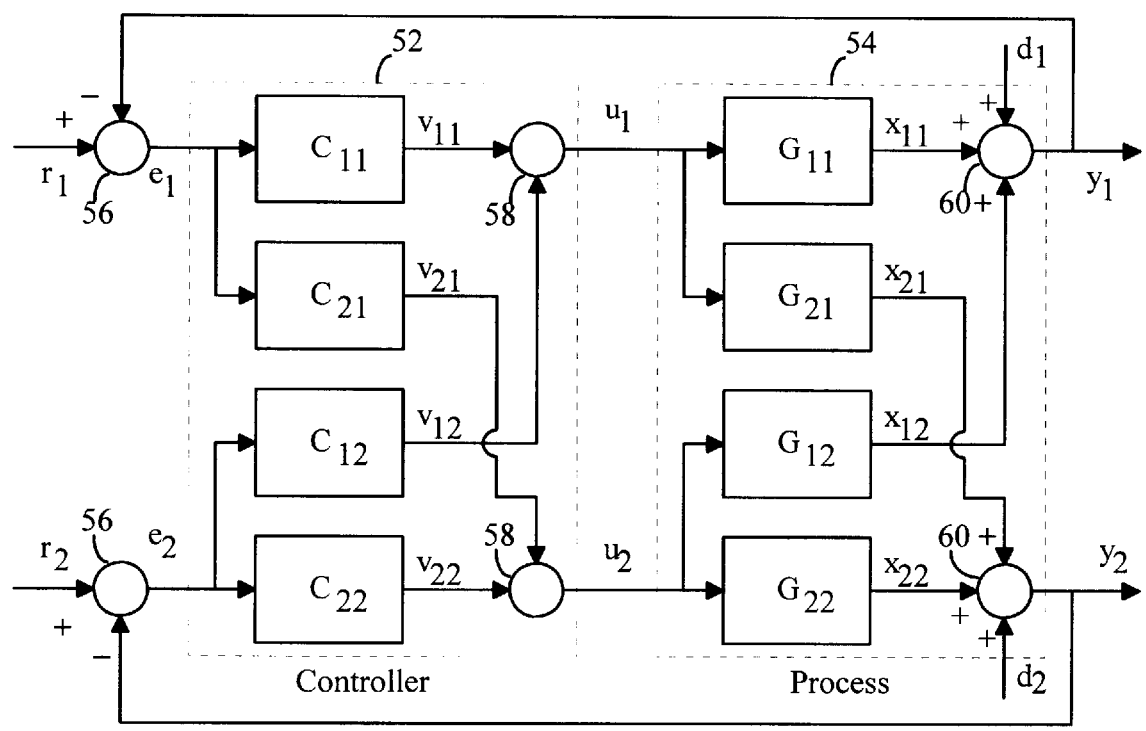
FIG. 4. is a block diagram illustrating a 2×2 multivariable model-free control system according to this invention.

Without losing generality, we will show how a multivariable model-free adaptive control system works with a 2-input-2-output (2×2) system as illustrated in FIG. 4, which is the 2×2 arrangement of FIG. 3. In the 2×2 MFA control system, the MFA controller set 52 consists of two controllers $C_{11}$, $C_{22}$, and two compensators $C_{21}$, and $C_{12}$. The process 54 has four sub-processes $G_{11}$, $G_{21}$, $G_{12}$, and $G_{22}$.

The process outputs as measured variables $y_1$ and y2 are used as the feedback signals of the main control loops. They are compared with the setpoints $r_1$ and $r_2$ at adders 56 to produce errors $e_1$ and $e_2$. The output of each controller associated with one of the inputs $e_1$ or $e_2$ is combined with the output of the compensator associated with the other input by adders 58 to produce control signals $u_1$ and $u_2$. The output of each sub-process is cross added by adders 60 to produce measured variables $y_1$ and $y_2$. Notice that in real applications the outputs from the sub-processes are not measurable and only their combined signals $y_1$ and $y_2$ can be measured. Thus, by the nature of the 2×2 process, the inputs $u_1$ and $u_2$ to the process are interconnected with its outputs y1 and y2. The change in one input will cause both outputs to change.

In this 2×2 system, the element number N in Equation 14 equals to 2 and the signals shown in FIG. 4 are as follows:

$r_1(t)$, $r_2(t)$—Setpoint of controllers $C_{11}$ and $C_{22}$, respectively.

$e_1(t)$, $e_2(t)$—Error between the setpoint and measured variable.

$v_{11}(t)$, $v_{22}(t)$—Output of controller $C_{11}$ and $C_{22}$, respectively.

$v_{21}(t)$, $v_{12}(t)$—Output of compensators $C_{21}$ and $C_{12}$, respectively.

$u_1(t)$, $u_2(t)$—Inputs to the process, or the outputs of the 2×2 controller set.

$x_{11}(t)$, $x_{21}(t)$, $x_{12}(t)$, $x_{22}(t)$—Output of process $G_{11}$, $G_{21}$, $G_{12}$ and $G_{22}$, respectively.

$d_1(t)$, $d_2(t)$—Disturbance to $y_1$ and $y_2$, respectively.

$y_1(t)$, $y_2(t)$—Measured Variables of the 2×2 process.

The relationship between these signals are as follows:

$$e_1(t) = r_1(t) - y_1(t) \tag{15a}$$

$$e_2(t) = r_2(t) - y_2(t) \tag{15b}$$

$$y_1(t) = x_{11}(t) + x_{12}(t) \tag{15c}$$

$$y_2(t) = x_{21}(t) + x_{22}(t) \tag{15d}$$

$$u_1(t) = v_{11}(t) + v_{12}(t) \tag{15e}$$

$$u_2(t) = v_{21}(t) + v_{22}(t) \tag{15f}$$

The controllers $C_{11}$ and $C_{22}$ have the same structure as the SISO MFA controller shown in FIG. 3. The input and output relationship in these controllers is represented by the following equations:

For Controller $C_{11}$:

$$p_j^{11}(n) = \sum_{i=1}^{N} w_{ij}^{11}(n) E_i^{11}(n) + 1, \tag{16}$$

$$q_j^{11}(n) = \varphi(p_j^{11}(n)), \tag{17}$$

$$v_{11}(n) = K_c^{11} \left[ \sum_{j=1}^{N} h_j^{11}(n) q_j^{11}(n) + 1 + e_1(n) \right], \tag{18}$$

$$\Delta w_{ij}^{11}(n) = \eta^{11} K_c^{11} e_1(n) q_j^{11}(n)(1 - q_j^{11}(n)) E_i^{11}(n) \sum_{k=1}^{N} h_k^{11}(n), \tag{19}$$

$$\Delta h_j^{11}(n) = \eta^{11} K_c^{11} e_1(n) q_j^{11}(n), \tag{20}$$

For Controller $C_{22}$ $$p_j^{22}(n) = \sum_{i=1}^{N} w_{ij}^{22}(n) E_i^{22}(n) + 1, \tag{21}$$

$$q_j^{22}(n) = \varphi(p_j^{22}(n)), \tag{22}$$

$$v_{22}(n) = K_c^{22} \left[ \sum_{j=1}^{N} h_j^{22}(n) q_j^{22}(n) + 1 + e_2(n) \right], \tag{23}$$

$$\Delta w_{ij}^{22}(n) = \eta^{22} K_c^{22} e_2(n) q_j^{22}(n)(1 - q_j^{22}(n)) E_i^{22}(n) \sum_{k=1}^{N} h_k^{22}(n), \tag{24}$$

$$\Delta h_j^{22}(n) = \eta^{22} K_c^{22} e_2(n) q_j^{22}(n), \tag{25}$$

In these equations, $\eta^{11} > 0$ and $\eta^{22} > 0$ are the learning rate, $K_c^{11} > 0$ and $K_c^{22} > 0$ are the controller gain for $C_{11}$ and $C_{22}$, respectively. $E_i^{11}(n)$ is the delayed error signal of $e_1(n)$ and $E_i^{22}(n)$ is the delayed error signal of $e_2(n)$.

Figure 5:
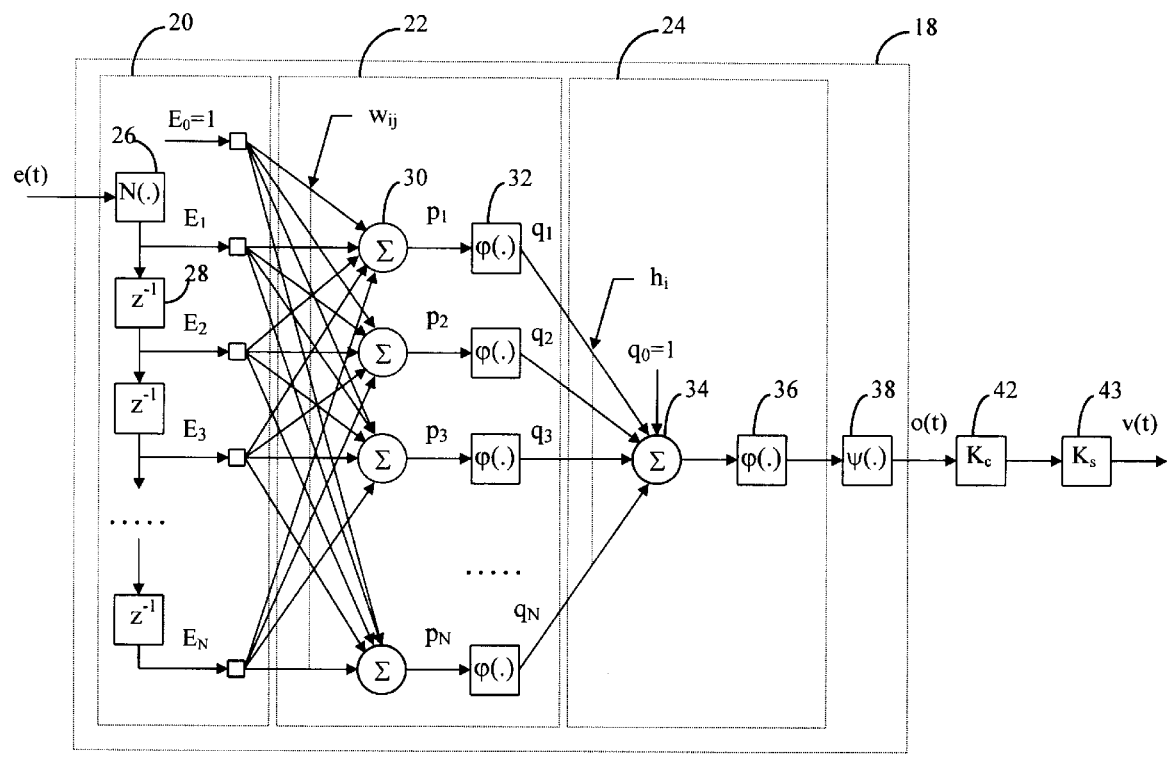
FIG. 5. is a block diagram illustrating the architecture of a MIMO model-free adaptive compensator according to this invention.

The structure of the compensators $C_{12}$ and $C_{21}$ is shown in FIG. 5. This structure differs from the structure of the SISO MFA controller of FIG. 2 in that no error signal is added to the neural network output o(t). The input and output relationship in these compensators is represented by the following equations:

For Compensator $C_{21}$ $$p_j^{21}(n) = \sum_{i=1}^{N} w_{ij}^{21}(n) E_i^{21}(n) + 1, \tag{26}$$

$$q_j^{21}(n) = \varphi(p_j^{21}(n)), \tag{27}$$

$$v_{21}(n) = K_s^{21} K_c^{21} \left[ \sum_{j=1}^{N} h_j^{21}(n) q_j^{21}(n) + 1 \right], \tag{28}$$

$$\Delta w_{ij}^{21}(n) = \eta^{21} K_c^{21} e_1(n) q_j^{21}(n)(1 - q_j^{21}(n)) E_i^{21}(n) \sum_{k=1}^{N} h_k^{21}(n), \tag{29}$$

$$\Delta h_j^{21}(n) = \eta^{21} K_c^{21} e_1(n) q_j^{21}(n), \tag{30}$$

For Compensator $C_{12}$ $$p_j^{12}(n) = \sum_{i=1}^{N} w_{ij}^{12}(n) E_i^{12}(n) + 1, \tag{31}$$

$$q_j^{12}(n) = \varphi(p_j^{12}(n)), \tag{32}$$

$$v_{12}(n) = K_s^{12} K_c^{12} \left[ \sum_{j=1}^{N} h_j^{12}(n) q_j^{12}(n) + 1 \right], \tag{33}$$

$$\Delta w_{ij}^{12}(n) = \eta^{12} K_c^{12} e_2(n) q_j^{12}(n)(1 - q_j^{12}(n)) E_i^{12}(n) \sum_{k=1}^{N} h_k^{12}(n), \tag{34}$$

$$\Delta h_j^{12}(n) = \eta^{12} K_c^{12} e_2(n) q_j^{12}(n), \tag{35}$$

In these equations, $\eta^{21} > 0$ and $\eta^{12} > 0$ are the learning rate, $K_c^{21} > 0$ and $K_c^{12} > 0$ are the controller gain, for $C_{21}$ and $C_{12}$ respectively. $E_i^{21}(n)$ is the delayed error signal of $e_1(n)$ and $E_i^{12}(n)$ is the delayed error signal of $e_2(n)$.

The compensator sign factors $K_s^{21}$ and $K_s^{12}$ 43 are a set of constants relating to the acting types of the process as follows:

$K_s^{21} = 1$, if $G_{22}$ and $G_{21}$ have different acting types (36a)

$K_s^{21} = -1$, if $G_{22}$ and $G_{21}$ have different acting types (36b)

$K_s^{21} = 1$, if $G_{11}$ and $G_{12}$ have different acting types (36c)

$K_s^{21} = -1$, if $G_{11}$ and $G_{12}$ have different acting types (36d)

These sign factors are needed to assure that the MFA compensators produce signals in the correct direction so that the disturbances caused by the coupling factors of the multivariable process can be reduced.

Figure 6:
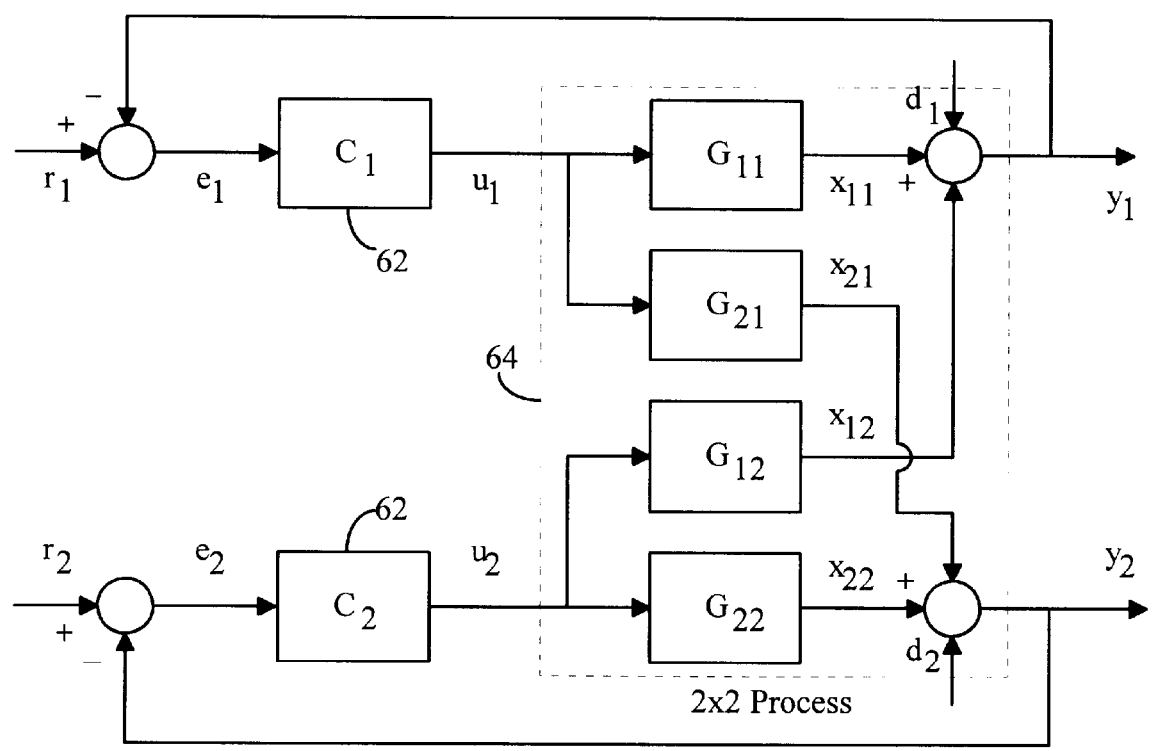
FIG. 6. is a block diagram illustrating a 2×2 process controlled by two single-loop MFA controllers according to this invention.

Multivariable processes can also be controlled by using single-loop MFA controllers. FIG. 6 shows a system diagram where 2 single loop model-free adaptive controllers 62 are used to control a 2-input-2-output process 64. In this case, the controllers will treat the coupling factors of the process as disturbances. The merit of this design is that the structure of the control system is simpler. Due to the powerful adaptive capability of the model-free adaptive controller, this system should work reasonably well for the multivariable processes whose coupling factors are not very strong.

Figure 7:
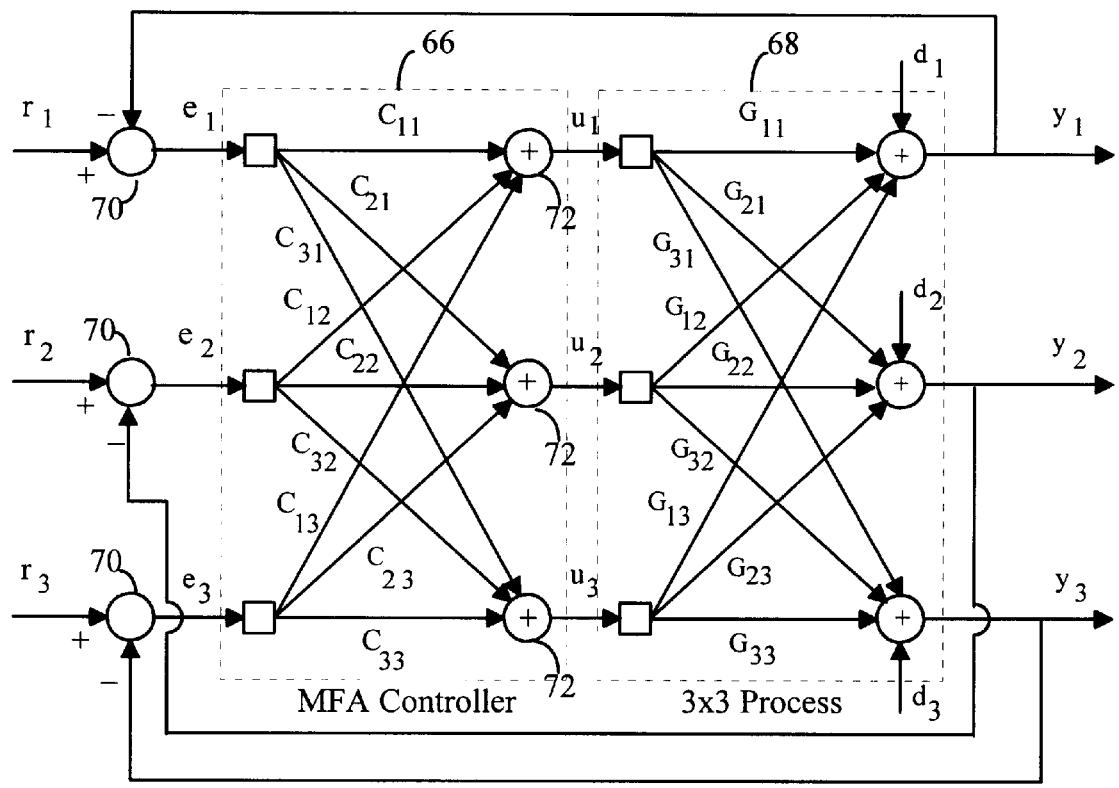
FIG. 7. is a block diagram illustrating a 3×3 multivariable model-free adaptive control system according to this invention.

A 3×3 multivariable model-free adaptive control system is illustrated in FIG. 7 with a signal flow chart. In the 3×3 MFA control system, the MFA controller set 66 consists of three controllers $C_{11}$, $C_{22}$, $C_{33}$; and six compensators $C_{21}$, $C_{31}$, $C_{12}$, $C_{32}$, $C_{13}$, $C_{23}$. The process 68 has nine sub-processes $G_{11}$ through $G_{33}$. The process outputs as measured variables $y_1$, $y_2$, and $y_3$ are used as the feedback signals of the main control loops. They are compared with the setpoints $r_1$, $r_2$, and $r_3$ at adders 70 to produce errors $e_1$, $e_2$ and $e_3$. The output of each controller associated with one of the inputs $e_1$, $e_2$, or $e_3$ is combined with the output of the compensators associated with the other two inputs by adders 72 to produce control signals $u_1$, $u_2$, and $u_3$.

Without losing generality, a set of equations that apply to an arbitrary N×N multivariable model-free adaptive control system is given in the following. If N=3, it applies to the above-stated 3×3 MFA control system.

For Controller $C_{ll}$ $$p_j^{ll}(n) = \sum_{i=1}^{N} w_{ij}^{ll}(n) E_i^{ll}(n) + 1, \qquad (37)$$

$$q_j^{ll}(n) = \varphi(p_j^{ll}(n)), \qquad (38)$$

$$v_{ll}(n) = K_c^{ll} \left[ \sum_{j=1}^{N} h_j^{ll}(n) q_j^{ll}(n) + 1 + e_l(n) \right], \qquad (39)$$

$$\Delta w_{ij}^{ll}(n) = \eta^{ll} K_c^{ll} e_l(n) q_j^{ll}(n)(1 - q_j^{ll}(n)) E_i^{ll}(n) \sum_{k=1}^{N} h_k^{ll}(n), \qquad (40)$$

$$\Delta h_j^{ll}(n) = \eta^{ll} K_c^{ll} e_l(n) q_j^{ll}(n), \qquad (41)$$

where $l = 1, 2, \ldots N$.

For Compensator $C_{lm}$ $$p_j^{lm}(n) = \sum_{i=1}^{N} w_{ij}^{lm}(n) E_i^{lm}(n) + 1, \qquad (42)$$

$$q_j^{lm}(n) = \varphi(p_j^{lm}(n)), \qquad (43)$$

$$v_{lm}(n) = K_s^{lm} K_c^{lm} \left[ \sum_{j=1}^{N} h_j^{lm}(n) q_j^{lm}(n) + 1 \right], \qquad (44)$$

$$\Delta w_{ij}^{lm}(n) = \eta^{lm} K_c^{lm} e_m(n) q_j^{lm}(n)(1 - q_j^{lm}(n)) E_i^{lm}(n) \sum_{k=1}^{N} h_k^{lm}(n), \qquad (45)$$

$$\Delta h_j^{lm}(n) = \eta^{lm} K_c^{lm} e_m(n) q_j^{lm}(n), \qquad (46)$$

where $l = 1, 2, \ldots N; m = 1, 2, \ldots N;$ and $l \neq m$.

In these equations, $\eta^{ll} > 0$ and $\eta^{lm} > 0$ are the learning rate, $K_c^{ll} > 0$ and $K_c^{lm} > 0$ are the controller gain, for $C_{ll}$ and $C_{lm}$ respectively. $E_i^{ll}(n)$ is the delayed error signal of $e_l(n)$ and $E_i^{lm}(n)$ is the delayed error signal of $e_m(n)$.

$K_s^{lm}$ is the sign factor for the MFA compensator, which is selected based on the acting types of the sub-processes as follows:

$K_s^{lm} = 1$, if $G_{ll}$ and $G_{lm}$ have different acting types (47a)

$K_s^{lm} = -1$, if $G_{ll}$ and $G_{lm}$ have the same acting type (47b)

where $l = 1, 2, \ldots N; m = 1, 2, \ldots N;$ and $l \neq m$.

C. Model-Free Adaptive Control for Processes with Large Time Delays

In process control applications, many processes have large time delays due to the delay in the transformation of heat, materials, and signals, etc. A good (example is a moving strip process such as a steel rolling mill or a paper machine. No matter what control action is taken, its effect is not measurable without a period of time delay. If a PID is used in this case, the controller output will keep growing during the delay time and cause a large overshoot in system responses or even make the system unstable. Smith Predictor is a useful control scheme to deal with processes with large time delays. However, a precise process model is usually required to construct a Smith Predictor. Otherwise, its performance may not be satisfactory.

Figure 8:
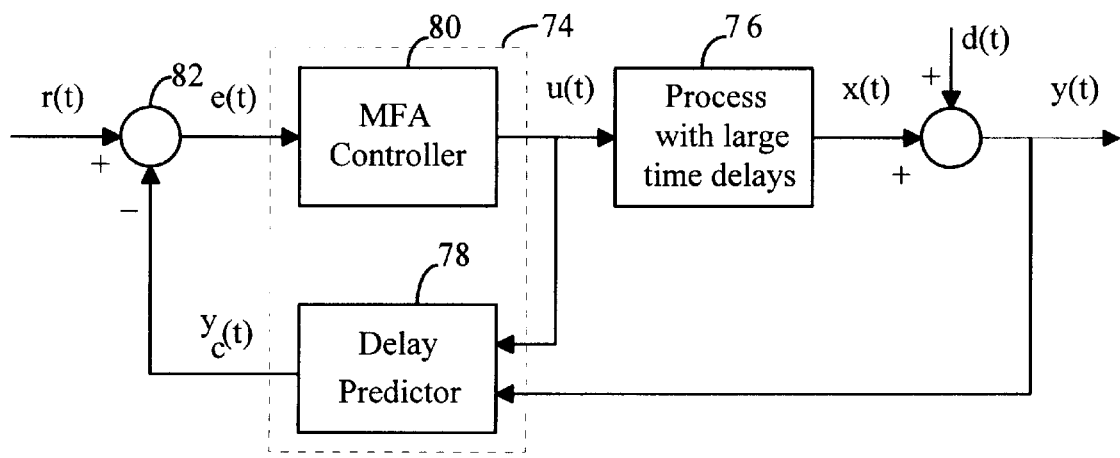
FIG. 8. is a block diagram illustrating a SISO model-free adaptive anti-delay control system according to this invention.

FIG. 8 shows a block diagram for a single-input-single-output model-free adaptive anti-delay control system with an MFA anti-delay controller 74 and a process with large time delays 76. A special delay predictor 78 is designed to produce a dynamic signal $y_c(t)$ to replace the measured variable $y(t)$ as the feedback signal. Then, the input to controller 80 is calculated through adder 82 as $$e(t) = r(t) - y_c(t). \qquad (48)$$

The idea here is to produce an e(t) signal for the controller and let it "feel" its control effect without much delay so that it will keep producing proper control signals.

Since the MFA controller in the system has powerful adaptive capability, the delay predictor can be designed in a simple form without knowing the quantitative information of the process. For instance, it can be designed in a generic first-order-lag-plus-delay (FOLPD) form represented by the following Laplace transfer function:

$$Y_c(S) = Y(S) + Y_p(S) \qquad (49)$$

$$= Y(S) + \frac{K(1 - e^{-\tau S})}{TS + 1} U(S),$$

where $Y(S)$, $Y_p(S)$, $U(S)$, and $Y_c(S)$ are the Laplace transform of signals $y(t)$, $y_p(t)$, $u(t)$ and $y_c(t)$, respectively; $y_p(t)$ is the predictive signal; $y_c(t)$ is the output of the predictor; $K$, $T$, $\tau$ are the parameters for the predictor based on the process approximation model in a FOLPD form. In real applications, DC Gain K can be set to close to 1 in the process of instrument calibration and data conversion. A rough estimation of process delay time can be easily provided by the user and it can be used as τ in the MFA predictor. T can be selected by the user or it can be given as $20T_s$, where $T_s$ is the sample interval. Later simulations show that the MFA anti-delay system is not very sensitive to these parameters.

Compared to the traditional Smith Predictor, the design here does not need the process model and the simulation shows that it can still achieve great control performance for processes with very large time delays.

Figure 9:
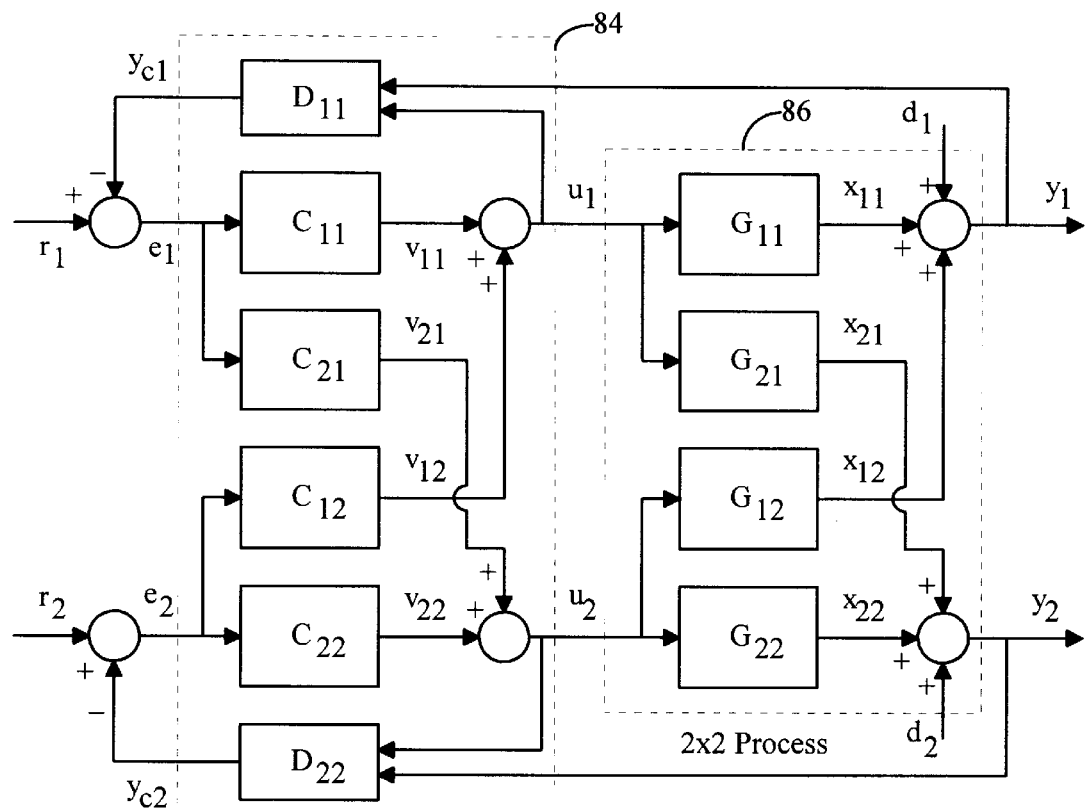
FIG. 9. is a block diagram illustrating a 2×2 model-free adaptive anti-delay control system according to this invention.

FIG. 9 illustrates a 2×2 Multivariable Model-Free Adaptive Anti-Delay Control System. The MFA anti-delay controller set 84 includes two MFA controllers $C_{11}$ and $C_{22}$, two compensators $C_{21}$, and $C_{12}$, and two predictors $D_{11}$ and $D_{22}$. The process 86 has large time delays in the main loops. Equation (49) can be applied for the design of the predictors. Without losing generality, higher order multivariable MFA Anti-Delay control system can be designed accordingly.

D. Model-Free Adaptive Cascade Control System

Figure 10:
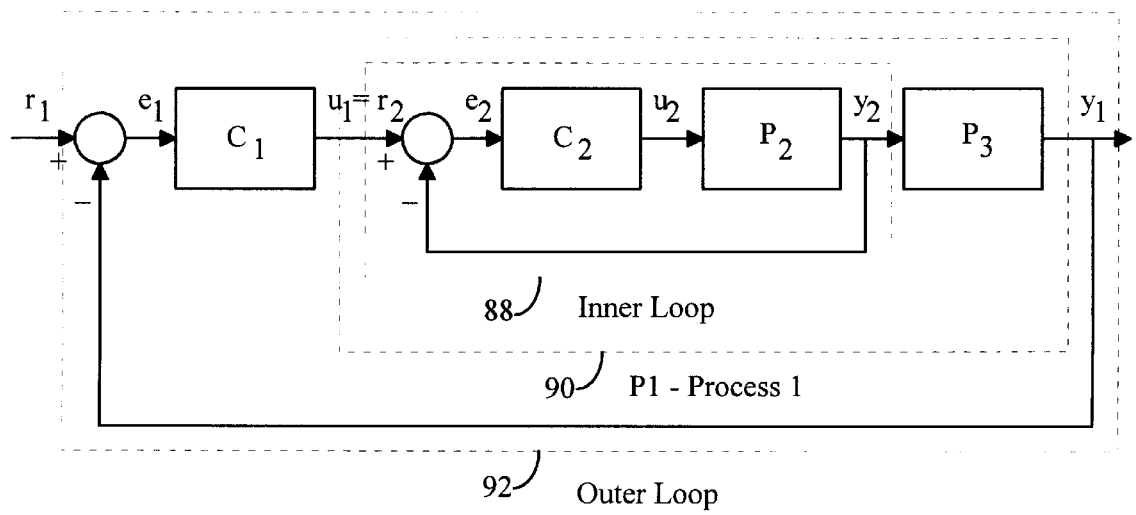
FIG. 10. is a block diagram illustrating a cascade control system with 2 MFA or PID controllers.

When a process has two or more major potential disturbances and the process can be divided into two loops (one is fast and one is slow), cascade control can be used to take corrective actions on disturbances more promptly for overall better control performance. As illustrated in FIG. 10, a cascade system contains two controllers, the primary controller $C_1$, and the secondary controller $C_2$. The inner loop 88 consists of $C_2$ and $P_2$, and the outer loop 92 consists of $C_1$ and $P_1$, where $P_1$ 90 consists of $C_2$, $P_2$, and $P_3$. The output of $C_1$ drives the setpoint of $C_2$.

Although cascade control is one of the most useful control schemes in process control, it is often found that in real cascade control applications the operators do not close the outer loop. They usually claim that as soon as the outer loop is closed, the system responses start to oscillate.

Due to the interacting nature of the loops in the cascade control system, the requirement for proper controller tuning becomes much more important. However, if PI or PID controllers are used, 4 to 6 PID parameters have to be tuned. Good combinations of so many parameters are not easy to find. If the process dynamics change frequently, the controllers need to be retuned all the time. Otherwise the interacting nature of the inner and outer loop can cause serious system stability problems. Since the MFA controller can compensate for process dynamic changes well, the closed-loop dynamics of the inner loop do not change much with MFA controller $C_2$ even though the process dynamics of $P_2$ may change a lot. This means the interconnection of the outer loop and the inner loop becomes much weaker. A more stable inner loop contributes to a more stable outer loop, and vice versa. In addition, since each single-variable MFA controller has only one tuning parameter, the controller gain Kc, and it usually does not need to be tuned, the model-free adaptive cascade control system becomes much easier to start up and maintain.

E. Simulation Results

The results of using the invention are best illustrated by the following simulation charts. In the discussion of these charts, the following notations are used:

S—Laplace transform operator, $G_p(S)$—Laplace transfer function of the process, Y(S) Laplace transform of y(t), the process output or measured variable, U(S)—Laplace transform of u(t), the process input or controller output.

The relationship between $G_p(S)$, Y(S), and U(S) is $$G_p(S) = \frac{Y(S)}{U(S)}. \tag{50}$$

The process models used in this simulation are represented in these equations:

$$\text{Model 1:} \quad G_{p1}(S) = \frac{1.5}{(100S^2 + 20S + 1.25)} \tag{51}$$

$$\text{Model 2:} \quad G_{p2}(S) = \frac{1}{(15S + 1)^2} \tag{52}$$

$$\text{Model 3:} \quad G_{p3}(S) = \frac{1}{(10S + 1)^2(20S + 1)(5S + 1)} \tag{53}$$

$$\text{Model 4:} \quad G_{p4}(S) = \frac{e^{-10S}}{(10S + 1)(5S + 1)} \tag{54}$$

$$\text{Model 5:} \quad G_{p5}(S) = \frac{1}{(10S + 1)^3(20S + 1)(5S + 1)} \tag{55}$$

$$\text{Model 6:} \quad G_{p6}(S) = \frac{e^{-90S}}{(10S + 1)(5S + 1)} \tag{56}$$

$$\text{Model 7:} \quad G_{p7}(S) = \frac{e^{-20S}}{(10S + 1)(5S + 1)} \tag{57}$$

Figure 11:
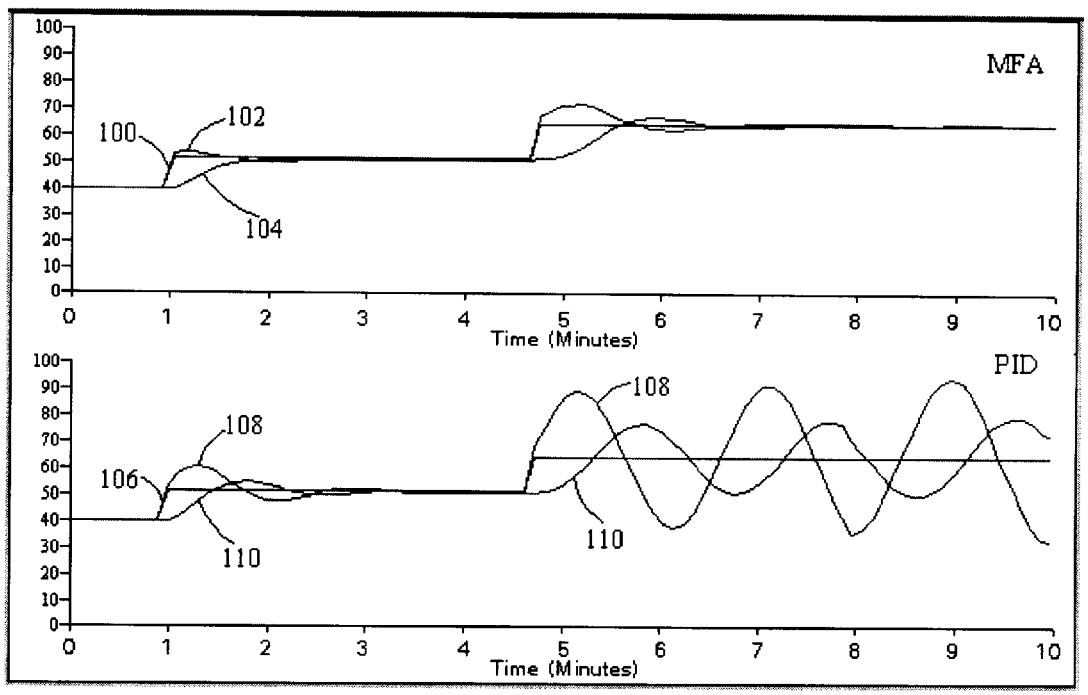
FIG. 11. is a time-amplitude diagram illustrating MFA and PID control of structure variant Process 1.
Figure 12:
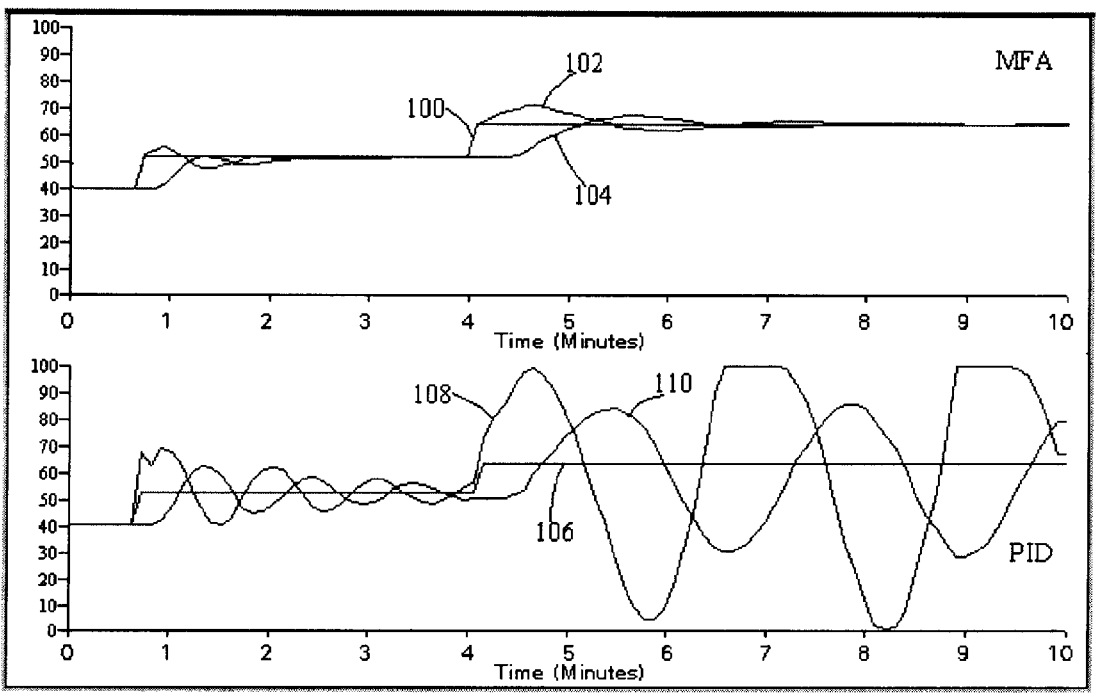
FIG. 12. is a time-amplitude diagram illustrating MFA and PID control of structure variant process 2.

FIGS. 11 and 12 show the simulation results of MFA and PID control for a structure variant process, which is very difficult to control. In this case, process models 2 through 5 are used. The process models are switched online during the simulation to create the structure change. In the simulation, the MFA controller gain $K_c=1$ as its neutral setting, and PID is tuned for Model 2 with $K_p=1$, $K_i=10$, and $K_d=2$. All the controller tuning parameters remain unchanged although the process changes.

In FIG. 11 and 12, curves 100 and 106 are setpoints for MFA and PID, curves 102 and 110 are measured variables for MFA and PID, and curves 102 and 108 are controller outputs for MFA and PID, respectively.

In FIG. 11, the process model starts with Model 2 and then changes to 3 just before the second setpoint change at about the 4.5 minute mark. In FIG. 12, the process model starts with Model 4 and then changes to 5 just before the second setpoint change at about the 3.7 minute mark. As will be readily seen, the MFA controller can adapt to process structure changes very well while the PID controller cannot.

Figure 13:
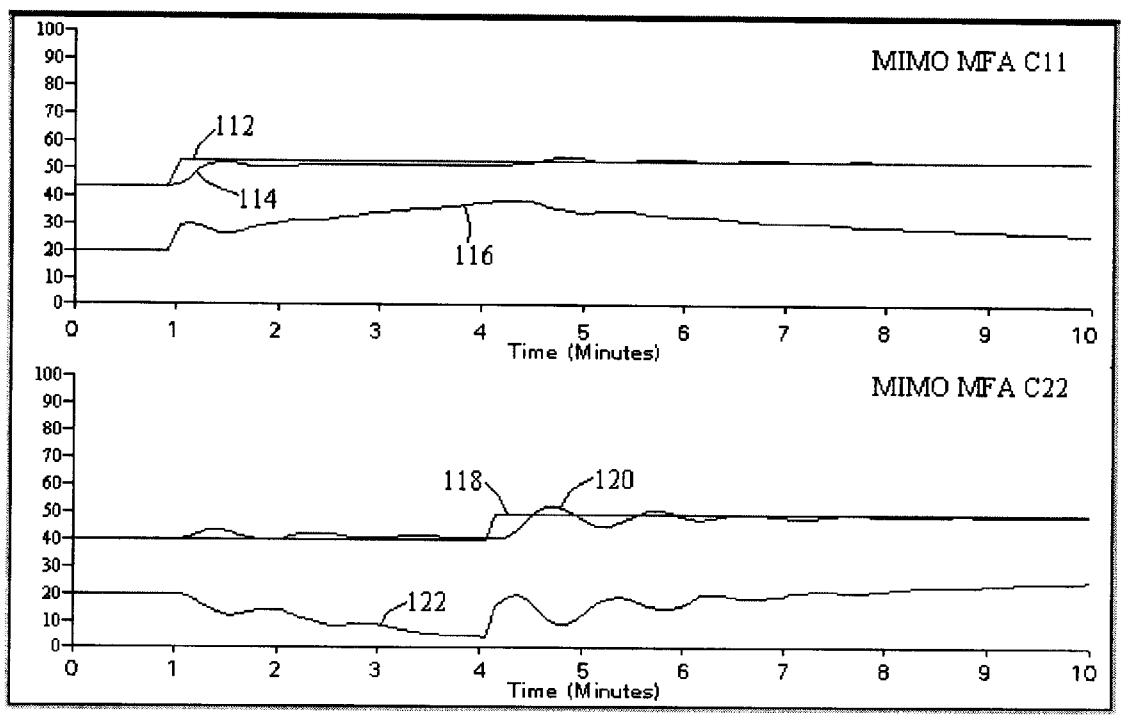
FIG. 13. is a time-amplitude diagram illustrating a 2×2 process controlled by MIMO MFA controller.
Figure 14:
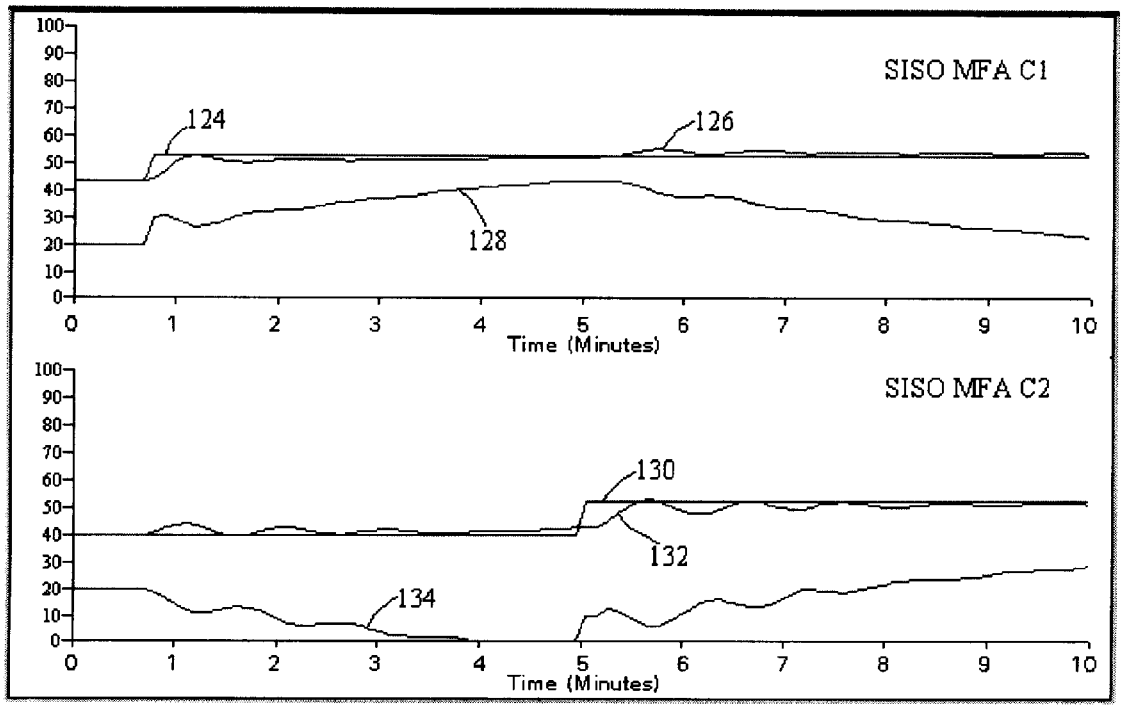
FIG. 14. is a time-amplitude diagram illustrating a 2×2 process controlled by two SISO MFA controllers.
Figure 15:
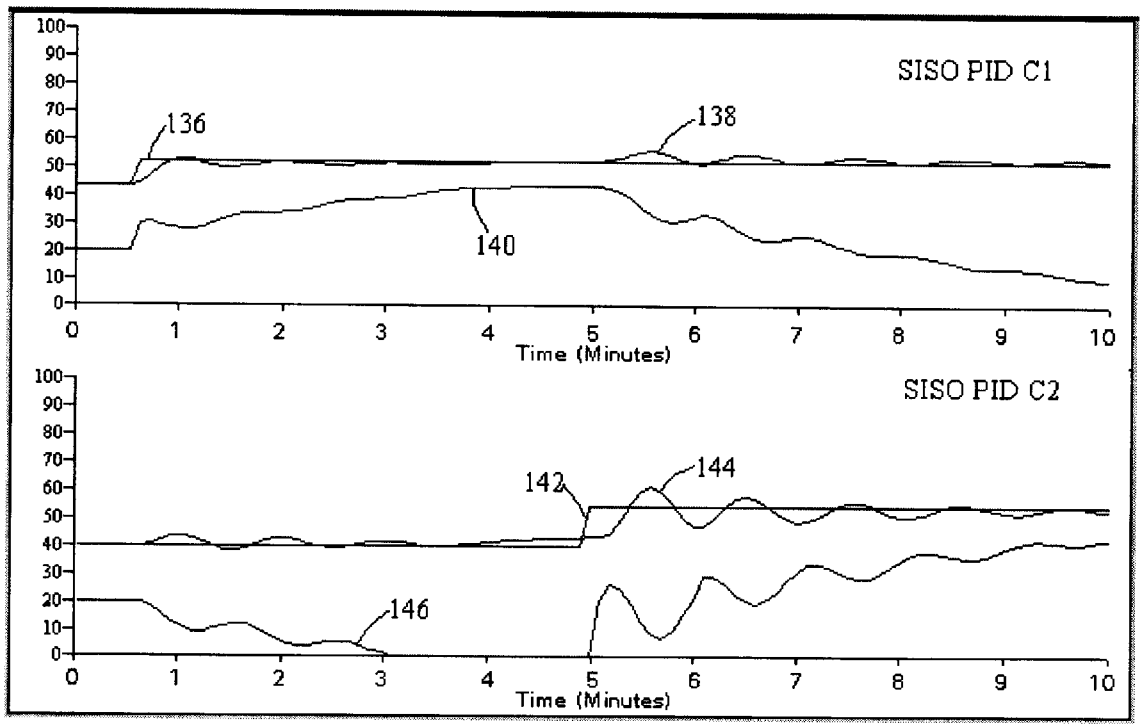
FIG. 15. is a time-amplitude diagram illustrating a 2×2 process controlled by two SISO PID controllers.

FIGS. 13 to 15 show the simulation results of a 2×2 process controlled by a set of MIMO MFA controllers, two SISO MFA controllers, and two SISO PID controllers, respectively. The 2×2 process is simulated by using Process Models 1, 2, 3, and 4 for $P_{11}$, $P_{21}$, $P_{12}$, and $P_{22}$, respectively. This MIMO process is heavily coupled so that it is quite difficult to control.

In FIG. 13, curves 112 and 118 are the setpoints $r_1$ and $r_2$, curves 114 and 120 are the measured variables $y_1$ and $y_2$, and curves 116 and 122 are outputs $v_{11}$ and $v_{22}$ for MIMO MFA controllers $C_{11}$ and $C_{22}$, respectively.

In FIG. 14, curves 124 and 130 are the setpoints $r_1$ and $r_2$, curves 126 and 132 are the measured variables $y_1$ and $y_2$, and curves 128 and 134 are outputs $u_1$ and $u_2$ for SISO MFA controllers $C_1$ and $C_2$, respectively.

In FIG. 15, curves 136 and 142 are the setpoints $r_1$ and $r_2$, curves 138 and 144 are the measured variables $y_1$ and $y_2$, and curves 140 and 146 are outputs $u_1$ and $u_2$ for SISO PID controllers $C_1$ and $C_2$, respectively.

Comparing FIGS. 13, 14, and 15, it is seen that the MIMO MFA has the best control performance and SISO PID has the worst control performance. Without the compensators, the output $u_2$ of SISO controller $C_2$ goes down to 0 percent bounded by the lower limit. With the MIMO MFA compensators, the MIMO controller gets a wider operating range so that its output $v_{22}$ can stay in the working range. In addition, the disturbances caused by the setpoint changes affect the other loop on a much smaller scale. To conclude, the MIMO MFA control can increase the system control performance and stability range. In these simulations, $K_c$ of the MFA controllers are set to 1 as their default setting without any tuning. The PID controller is well tuned but its performance is still not very satisfactory.

Figure 16:
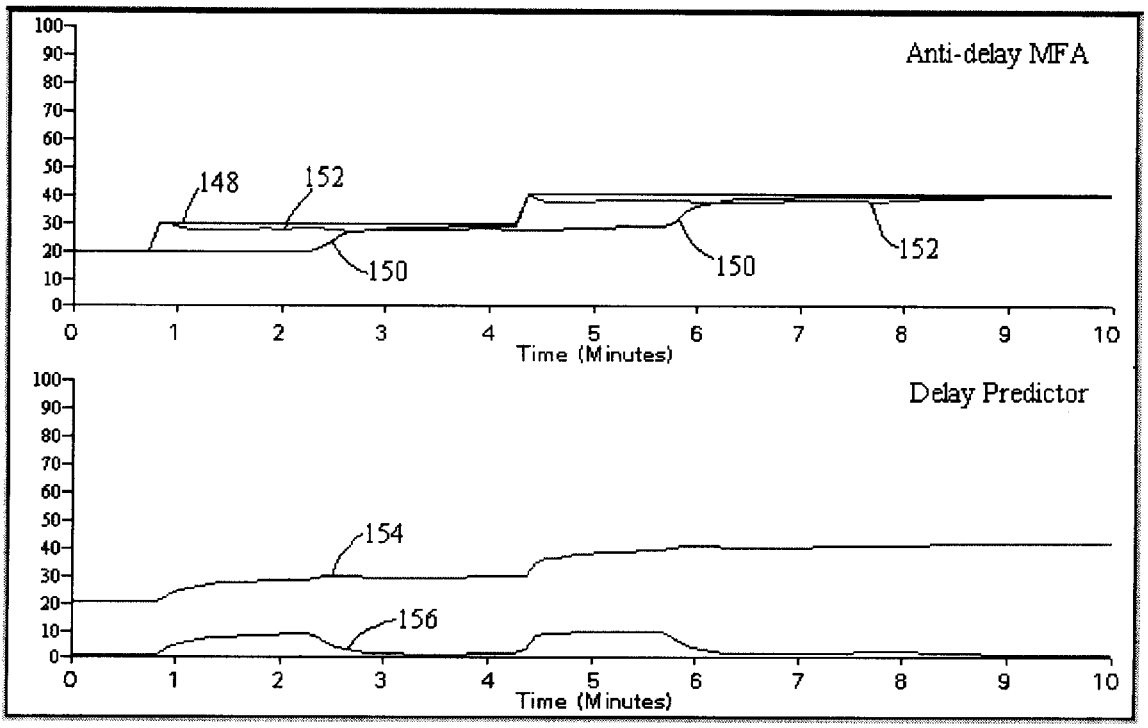
FIG. 16. is a time-amplitude diagram illustrating an anti-delay MFA controller for process with large time delays.
Figure 17:
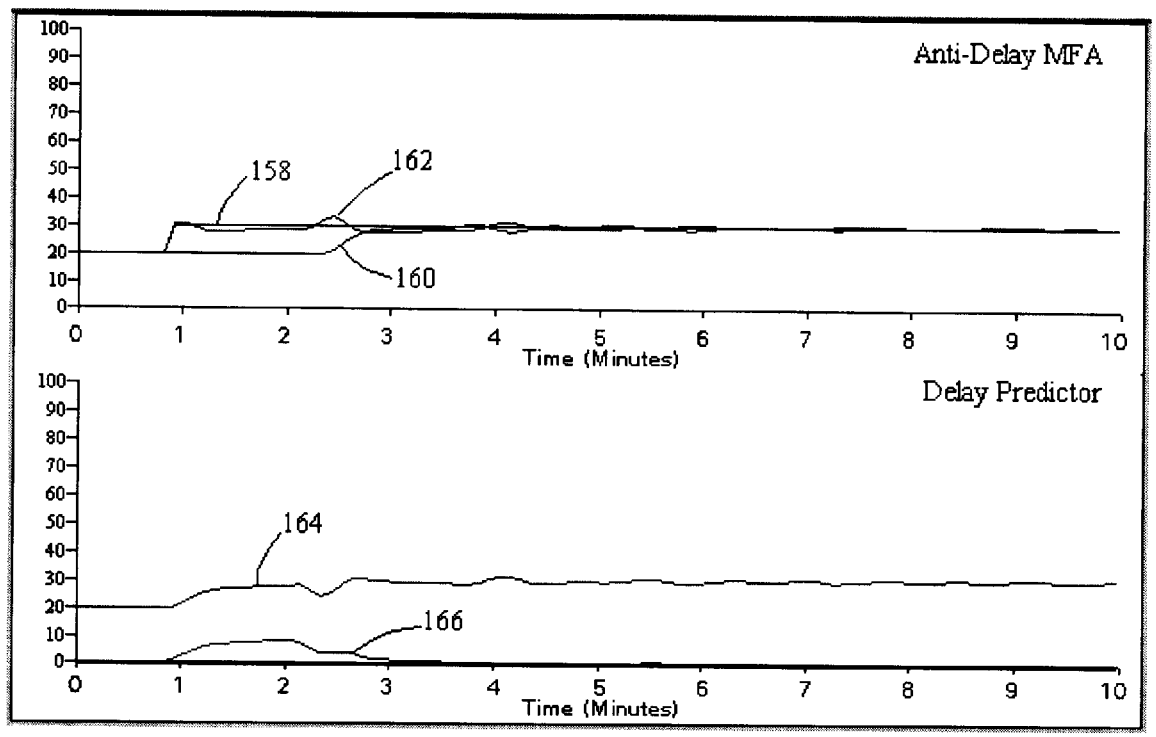
FIG. 17. is a time-amplitude diagram illustrating an anti-delay MFA control with a mismatched predictor model.

FIGS. 16 and 17 show the simulation results of a process controlled by an anti-delay MFA controller with different delay predictor parameters. Model 6 is used to simulate a process with large time delays. In these Figures, curves 148 and 158 show the setpoint r(t), curves 150 and 160 show the true measured variable y(t), curves 152 and 162 show the controller output u(t), curves 154 and 164 show the output of the predictor $y_c(t)$, and curves 156 and 166 show the predictive signal $y_p(t)$.

How the delay time affects the process dynamics is related to the time constant. Usually, τ-T ratio is used to measure the significance of time delay effects to a process as follows:

$$\tau/T \text{ Ratio} = \frac{\text{Delay Time } \tau}{\text{Time Constant } T} \quad (58)$$

A PID controller can usually handle a process with τ/T Ratio around 1. Here in Model 6, τ/T Ratio is as high as 9. (τ=90, dominant time constant T=10). It is very difficult for any kind of regular controller to handle. However, the anti-delay MFA controller can control this process quite easily. In FIG. 16, predictor τ=90, T=20, which matches to the process quite well. In FIG. 17, a mismatch between predictor parameters and process is deliberately created. The predictor parameters are τ=75, T=20, the process parameters are τ=90, Dominant T=10. They are significantly mismatched. However, as shown in FIG. 17, the MFA can still control the process well. The anti-delay MFA controller has major advantages compared to the traditional Smith Predictor control scheme.

Figure 18:
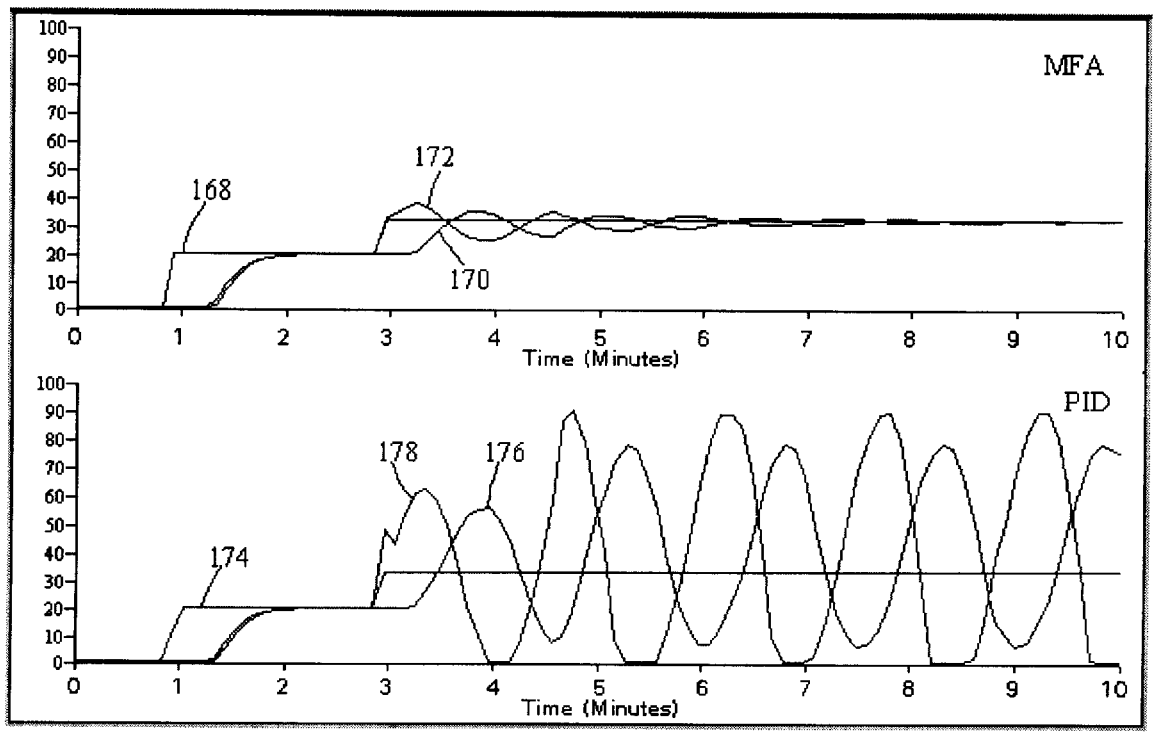
FIG. 18. is a time-amplitude diagram illustrating and MFA and PID control for process with large time delays.

FIG. 18 shows the simulation results of control for processes with large time delays using regular MFA and PID controllers. In FIG. 18, curves 168 and 174 are the setpoints, curves 170 and 176 are the measured variables, and curves 172 and 178 are the outputs. The Process Model 7 is used in the simulation. Since the τ/T Ratio is 2 for Model 7 (τ=20, Dominant T=10), it is much easier to control compared to Model 6. However, it is seen that even MFA cannot control this process too well, while PID just cannot deal with a process like that no matter how you tune it. This simulation also implies the value of the anti-delay MFA controller shown in FIGS. 16 and 17.

Figure 19:
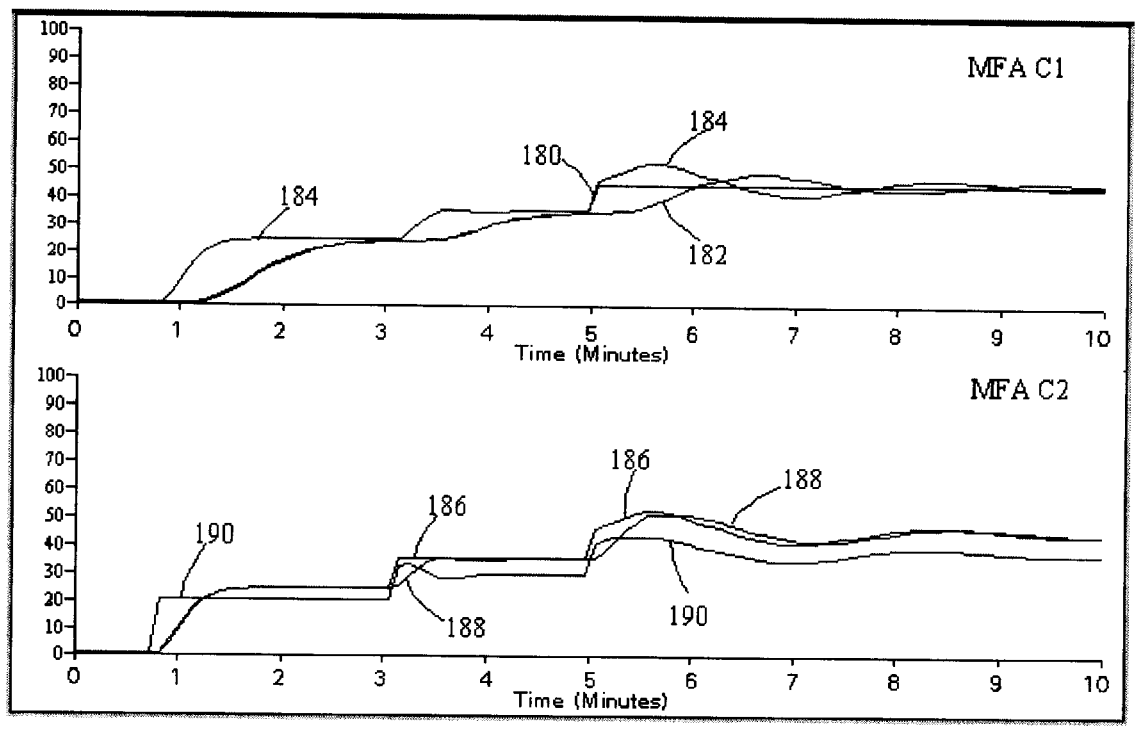
FIG. 19. is a time-amplitude diagram illustrating model-free adaptive control for cascade systems.
Figure 20:
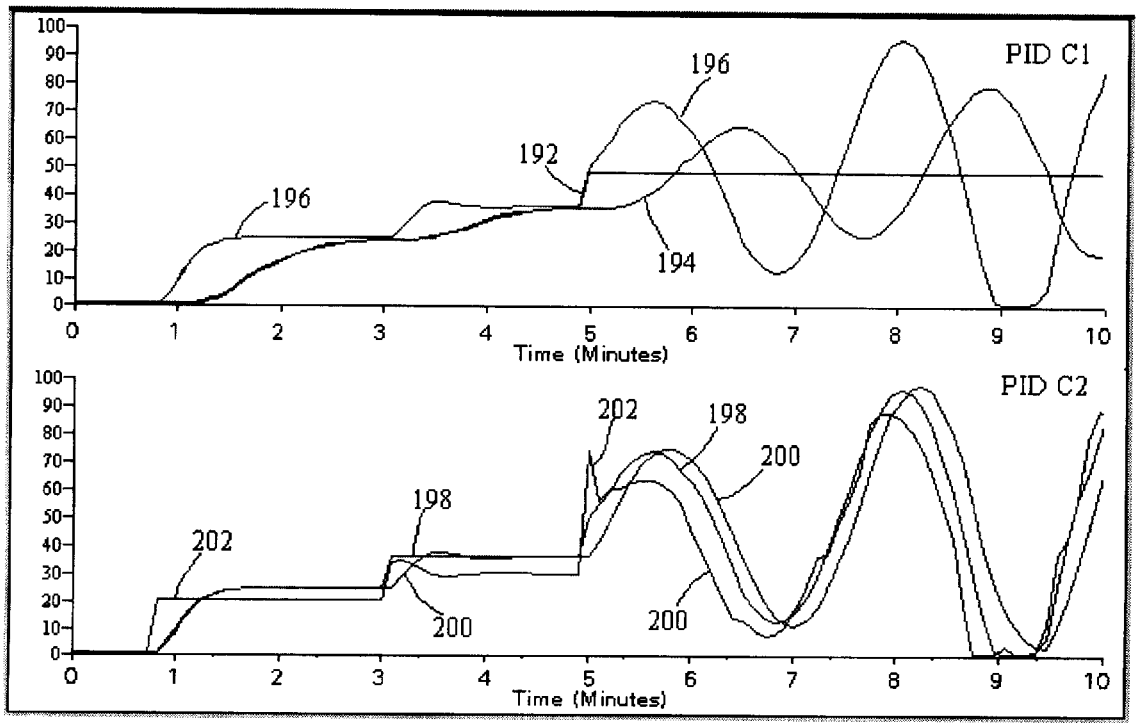
FIG. 20. is a time-amplitude diagram illustrating PID control for cascade systems.

FIGS. 19 and 20 show the MFA and PID control for cascade systems.

In FIG. 19, curves 180 and 186 are setpoints for $C_1$ and $C_2$, curves 182 and 188 are measured variables for $C_1$ and $C_2$, and curves 184 and 190 are outputs for $C_1$ and $C_2$, respectively.

In FIG. 20, curves 192 and 198 are setpoints for $C_1$ and $C_2$, curves 194 and 200 are measured variables for $C_1$ and $C_2$, and curves 196 and 202 are outputs for $C_1$ and $C_2$, respectively.

The simulation starts when both inner loop and outer loop are open, and $u_2$ (curve 190 or 202) is set to 20 percent. The inner loop is closed by turning the Auto/Manual switch of $C_2$ to auto at the 3 minute mark and its setpoint $r_2$ (curve 186 or 198) is raised from 20 to 30 percent. It is seen that either MFA or PID can control the inner loop well. The Remote/Local switch of $C_2$ is set to Remote asking for a remote setpoint at the 4.8 minute mark It will force the setpoint of $C_2$, $r_2$ (curve 186 or 198) to track the output of $C_1$, $u_1$ (curves 184, 196). After that, the outer loop is closed by turning the Auto/Manual switch of $C_1$ to auto. Then both loops are closed and the system is cascaded. By changing the setpoint of $C_1$, $r_1$ (curve 180 or 192), the control performance of the cascade system is simulated. It is seen that the MFA controllers can control the cascade system without any special requirement. The controller gain $K_c=1$, is the default setting for both MFA $C_1$ and $C_2$. On the other hand, the PID controlled system becomes quickly unstable. During this simulation, a real effort was made to tune the PID, but the result was still unsatisfactory. The reason is that PID is sensitive to process dynamic changes. In fact interactions between the inner and outer loops of a cascade system (create major dynamic changes.

F. Simulation of Real Process

A real distillation column model, the Wood and Berry column 21, is selected for the simulation of the MIMO MFA control system. The model is represented by the following Laplace transfer functions:

$$G_{11} = \frac{e^{-S}}{16.7S + 1} \quad (59)$$

$$G_{21} = \frac{0.52e^{-7S}}{10.9S + 1} \quad (60)$$

$$G_{12} = \frac{-1.48e^{-3S}}{21S + 1} \quad (61)$$

$$G_{22} = \frac{-1.52e^{-3S}}{14.4S + 1} \quad (62)$$

$$F_{11} = \frac{0.3e^{-8.1S}}{14.9S + 1} \quad (63)$$

$$F_{22} = \frac{0.38e^{-3.4S}}{13.2S + 1} \quad (64)$$

$$\begin{bmatrix} X_D(S) \\ X_B(S) \end{bmatrix} = \begin{bmatrix} G_{11}(S) & G_{12}(S) \\ G_{21}(S) & G_{22}(S) \end{bmatrix} \begin{bmatrix} R_f(S) \\ S_f(S) \end{bmatrix} + \begin{bmatrix} F_{11}(S) \\ F_{22}(S) \end{bmatrix} F_r(S), \quad (65)$$

$$= \begin{bmatrix} G_{11}(S) & G_{12}(S) \\ G_{21}(S) & G_{22}(S) \end{bmatrix} \begin{bmatrix} R_f(S) \\ S_f(S) \end{bmatrix} + \begin{bmatrix} D_{11}(S) \\ D_{22}(S) \end{bmatrix},$$

where $X_D$ is the top composition or distillation composition, $X_B$ is the bottom composition, $R_f$ is the reflux flow, $S_f$ is the steam flow, and $F_r$ is the feed rate. $D_{11}$ and $D_{22}$ are the disturbances caused by the feed rate change.

Figure 21:
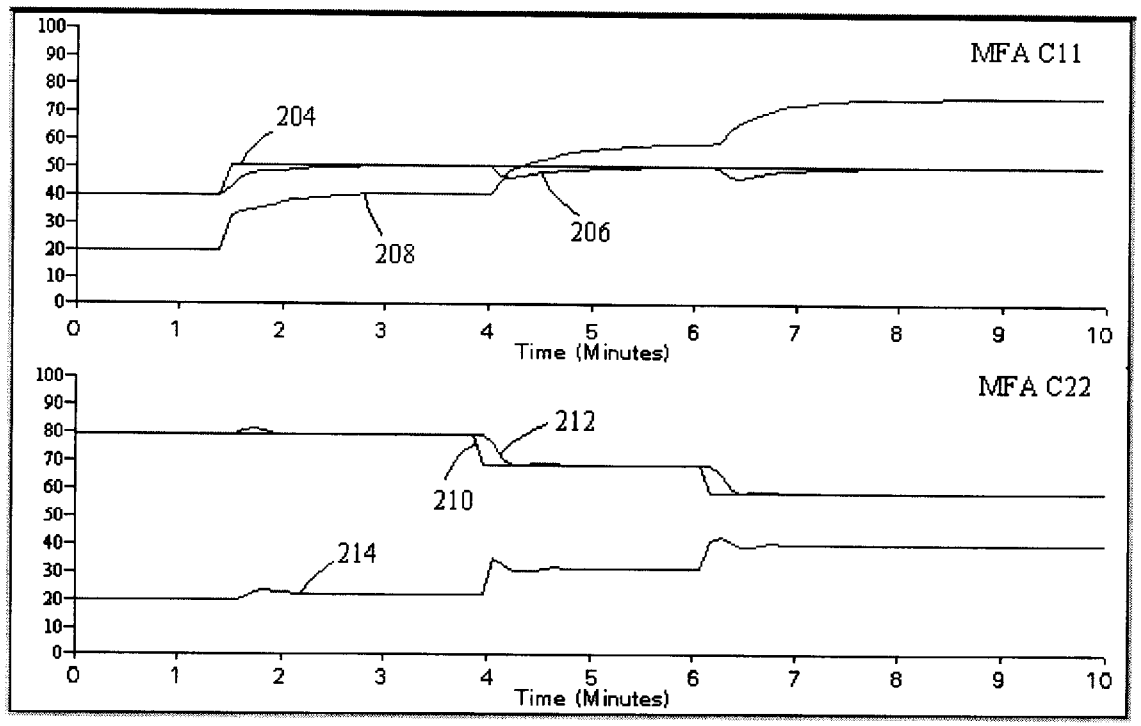
FIG. 21. is a time-amplitude diagram illustrating MIMO MFA control for distillation columns with setpoint change.
Figure 22:
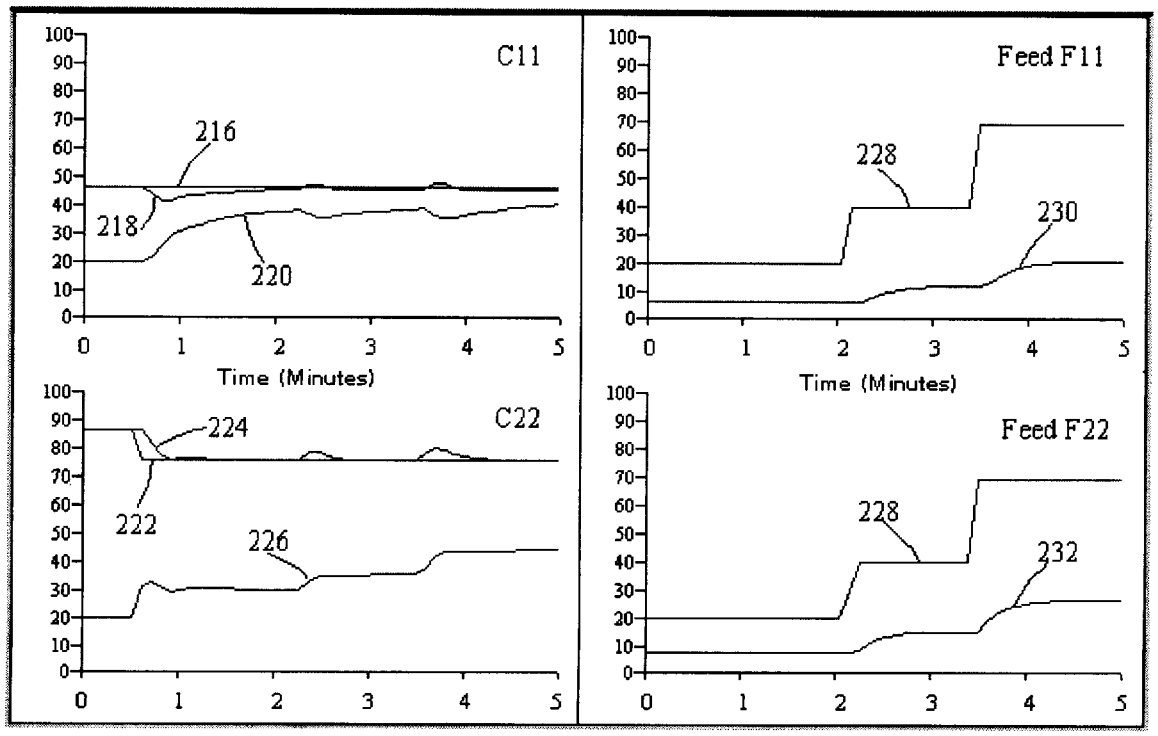
FIG. 22. is a time-amplitude diagram illustrating MIMO MFA control for distillation columns with load change.

FIGS. 21 and 22 show the simulation results for this distillation column with a 2×2 MFA controller set. FIG. 21 shows the control performance for setpoint changes and FIG. 22 shows the control performance for load changes.

In FIG. 21, curves 204 and 210 are the setpoints for $C_{11}$ and $C_{22}$, curves 206 and 212 are the measured variables for $C_{11}$ and $C_{22}$, and curves 208 and 214 are the outputs for $C_{11}$ and $C_{22}$, respectively. It is seen that $r_1$ (curve 204) is raised at the 1.3 minute mark and $r_2$ (curve 210) is reduced at about the 4 minute and 6 minute marks. Good overall control performance is demonstrated. Due to the functions of the MFA compensators included in the MIMO MFA controller set, the magnitude of the disturbances is small. If regular PID controllers were used the disturbances would be much more significant, which would cause major control problems.

In FIG. 22, curves 216 and 222 are the setpoints for $C_{11}$ and $C_{22}$, curves 218 and 224 are the measured variables for $C_{11}$ and $C_{22}$, and curves 220 and 226 are the outputs for $C_{11}$ and $C_{22}$, respectively. Curve 228 is the feed rate setpoint $f_r(t)$ ($F_r(S)$ in Laplace transform), and curves 230 and 232 are the disturbance signals $d_{11}(t)$ and $d_{22}(t)$ ($D_{11}(S)$ and $D_{22}(S)$ in Laplace transform) caused by the feed rate change. The simulation shows that the feed rate changes twice at the 2 minute and 3.3 minute mark which causes disturbances to the system. The MFA controllers are able to compensate for these disturbances.

What is claimed is:

1. A model-free adaptive control system for an open-loop stable, controllable, and direct-acting or reverse-acting industrial process having a process input, a process output which is a constituent of a measured process variable, and a sensitivity function which is the ratio $$\frac{\partial y(t)}{\partial u(t)}$$

of the partial derivatives with respect to time of said process output and said process input, comprising:

a) a dynamic block having a single error value input and a control value output, said dynamic block being arranged to iteratively, over a moving window of time, vary said control value to minimize said error value;

b) a control objective function arranged to compute said error value from the difference value between said measured process variable and a selected setpoint; and c) a learning mechanism arranged to continuously iteratively modify the parameters of said dynamic block to vary said control value so as to reduce said error value, said learning mechanism being based solely on said measured process variable, said control value output, and said setpoint;

d) an arbitrary non-zero constant being substituted for the actual sensitivity function of said process in said learning mechanism;

e) said process being controlled in accordance with said control value output.

2. The controller of claim 1, in which said arbitrary constant is 1.

3. The controller of claim 1, in which said control objective function is $E_s(t)=\frac{1}{2}e(t)^2$, wherein $E_s(t)$ is said error value, and $e(t)$ is said difference value between said measured process variable and said setpoint.

4. The controller of claim 1, in which said dynamic block is a neural network which has as its first-level inputs a plurality of successively time-delayed inputs of said error value.

5. The controller of claim 1, in which the output of said dynamic block and said difference value are added to produce said control value.

6. A model-free adaptive control system for an open-loop stable, controllable, and direct-acting or reverse acting industrial process having a process input, a process output which is a constituent of a measured process variable with a large time delay in responding to said process input, and a sensitivity function which is the ratio of the partial derivatives with respect to time of said process output and said process input, comprising:

a) a dynamic block having an error value input and a control value output, said dynamic block being arranged to iteratively, over a moving window of time, vary said control value to minimize said error value;

b) a delay predictor having as its inputs said measured process variable and said control value output, the output of said delay predictor being $$Y_c(S) = Y(S) + \frac{K(1 - e^{-\tau S})}{TS + 1} U(S)$$

wherein $Y(S)$, $U(S)$ and $Y_c(S)$ are the Laplace transforms of said measured variable, said control value output, and said delay predictor output, respectively, and $K$, $T$ and $\tau$ are constants;

c) a control objective function arranged to compute said error value from the difference value between the output of said delay predictor and a selected setpoint;

d) a learning mechanism arranged to continuously iteratively modify the parameters of said dynamic block to vary said control value so as to reduce said error value based solely on said measured process variable and said setpoint, an arbitrary non-zero constant being substituted for the actual sensitivity function of said process in said learning mechanism; and e) said process being controlled in accordance with said control value.

7. The controller of claim 6, in which $K$ is substantially 1, and $T$ and $\tau$ are chosen to approximate known response delay parameters of said process.

8. An adaptive control system for a plurality of open-loop stable interacting industrial processes each having a process input, a process output which is a constituent of a measured process variable with a large time delay in responding to said process input, and a sensitivity function which is the ratio of the partial derivatives with respect to time of said process output and said process input comprising:

a) a first plurality of dynamic controller blocks each having an error value input and a control value output;

b) a second plurality of dynamic compensator blocks each having an error value input and a compensation value output;

c) a third plurality of delay predictors associated with said processes and having an output and a pair of inputs;

d) a plurality of adders arranged to add to each of said control value output of said first plurality of dynamic blocks the compensation value outputs of each of said second plurality of dynamic blocks;

e) the output of each of said adders being the process input of one of said interacting processes and one of said inputs of one of said delay predictors;

f) the other input of each of said delay predictors being said measured variable of said associated process;

g) a control objective function arranged to compute said error value for each of said first plurality of dynamic blocks from the difference value between the output of one of said delay predictors and a selected setpoint for the process associated therewith; and h) a learning mechanism arranged to continuously iteratively modify the parameters of each of said first and second plurality of blocks to vary said control values and compensation values so as to reduce error values, said learning mechanism being based solely on said measured process variables and said setpoints;

i) the output of said delay predictor being $$Y_c(S) = Y(S) + \frac{K(1 - e^{-\tau S})}{TS + 1} U(S)$$

wherein Y(S), U(S) and $Y_c$(S) are the Laplace transforms of said measured variable, said adder output, and said delay predictor output, respectively, and K, T and τ are constants; and j) each of said processes being controlled in accordance with the respective output of one of said plurality of adders.

9. The system of claim 8, in which said sensitivity function is set at 1 regardless of the actual value of said sensitivity function.

10. An iterative model-free adaptive control system for a process which produces a measured variable output value in response to a control input value, but whose structure and quantitative response characteristics are unknown, comprising:

a) a controller having as its input an error value, said error value being the difference between a predetermined setpoint value and a value representative of said measured variable;
  b) said controller having a control output value which is at least a component of said control input value of said process;
  c) said controller including a three-layered artificial neural network, which includes;
    i) a first layer composed of a first plurality of neurons each of which has as its input and output a value representative of said error value in one of a plurality of successive iterations;
    ii) a second layer composed of a second plurality of neurons each of which has as its inputs the values of the outputs of each of said first plurality of neurons times a first variable weight factor; and whose output value is the sum of its input values; and
    iii) a third layer neuron whose inputs are values representative of the output value of each of said second plurality of neurons times a second variable weight factor, and whose output value is the sum of its input values;
  d) said control output value being a value representative of the sum of a value representative of the output value of said third-layer neuron and said error value in the current iteration;
  e) said first weight factor being continuously updated in successive iterations according to the formula $$\Delta w_{ij}(n) = \eta K_c \frac{\partial y(n)}{\partial u(n)} e(n) q_j(n)(1 - q_j(n)) E_i(n) \sum_{k=1}^{N} h_k(n)$$

in which $\Delta W_{ij}$ is the change in the weight factor of the output of the ith first plurality neuron to the jth second plurality neuron from the past previous iteration to the current iteration; η is a preselected learning factor; $K_c$ is a preselected constant;

$$\frac{\partial y(n)}{\partial u(n)}$$

is the sensitivity function of said process; e is the error value; $q_j$ is the normalized output of the jth second plurality neuron;

$E_i$ is the normalized error value applied to the ith first plurality neuron; N is the number of first plurality neurons $$\sum_{k=1}^{N} h_k$$

is the sum of said second weight factors; and (n) designates the current iteration; and f) said second weight factor being continuously updated in successive iterations according to the formula $$\Delta h_j(n) = \eta K_c \frac{\partial y(n)}{\partial u(n)} e(n) q_j(n)$$

in which $\Delta h_j$ is the change in the weight factor of the output of the jth second plurality neuron to said third-layer neuron from the last previous iteration to the current iteration;

g) said process being controlled in accordance with said control input value.

11. The system of claim 10, in which said sensitivity function is set as 1 regardless of the actual value of said sensitivity function.

12. An adaptive control system for a plurality of open-loop stable interacting industrial processes each having a process input, a measured process output, and a sensitivity function which is the ratio of the partial derivatives with respect to time of said process output and said process input, comprising:

a) a first plurality of dynamic blocks each having an error value input and a control value output;
  b) a second plurality of dynamic blocks each having an error value input and a compensation value output;
  c) a plurality of adders arranged to add to each of said control value outputs of said first plurality of dynamic blocks the compensation value outputs of each of said second plurality of dynamic blocks;
  d) the output of each of said adders being the process input of one of said interacting processes;
  e) a control objective function arranged to compute said error value for each of said first plurality of dynamic blocks from the difference value between said measured process output of a corresponding process and a selected setpoint for that process; and
  f) a learning mechanism arranged to continuously iteratively modify the parameters of each of said first and second plurality of blocks to vary said control values and compensation values so as to reduce said error values, said learning mechanism being based solely on said measured process outputs and said setpoints;
  g) each of said processes being controlled in accordance with a respective one of said process inputs.

13. The system of claim 12, in which said learning mechanism iteratively modifies said parameters as functions of said sensitivity functions, in which arbitrary non-zero constants are substituted for the actual sensitivity functions of said processes.

14. The system of claim 13, in which said arbitrary constant is 1.

15. The system of claim 12, in which the output of each of only said first plurality of blocks and the difference value corresponding to that block are added to produce the control value of that block.

16. The system of claim 12, in which each of said first and second pluralities has a plurality of successively time-delayed error value inputs.

17. The controller of claim 12, in which said control objective function is $E_s(t)=\frac{1}{2}e(t)^2$, wherein $E_s(t)$ is said error value, and e(t) is said difference value between said measured process variable and said setpoint.

18. The system of claim 12, in which said dynamic blocks are artificial neural networks.

19. An iterative model-free adaptive control system for a plurality of interactive processes which produce measured variable output values in response to process control input values, but whose structure and quantitative response characteristics are unknown, comprising:
   a) a first plurality of controllers having as its input an error value, said error value for each said controller and compensator being the difference between a predetermined setpoint value and a value representative of said measured variable for the process corresponding to that controller;
   b) said controller and compensator having a control output value which is summed to produce said process control input value for the corresponding process; and
   c) each said controller and compensator including a three-layered artificial neural network, which includes;
      i) a first layer composed of a first plurality of neurons each of which has as its input and output a value representative of said error value in one of a plurality of successive iterations;
      ii) a second layer composed of a second plurality of neurons each of which has as its inputs the values of the outputs of each of said first plurality of neurons times a first variable weight factor; and whose output value is the sum of its input values; and
      iii) a third-layer neuron whose inputs are values representative of the output value of each of said second plurality of neurons times a second variable weight factor, and whose output value is the sum of its input values;
   d) said control output value being a value representative of the output value of said third-layer neuron plus, in said controllers only, a value representative of said error value in the current iteration;
   e) said first weight factor being continuously updated in said controller in successive iterations according to the formula $$\Delta w_{ij}^{ll}(n) = \eta^{ll} K_c^{ll} e_l(n) q_j^{ll}(n)(1-q_j^{ll}(n))E_i^{ll}(n)\sum_{k=1}^{N} h_k^{ll}(n)$$

and in said compensator according to the formula $$\Delta w_{ij}^{lm}(n) = \eta^{lm} K_c^{lm} e_m(n) q_j^{lm}(n)(1-q_j^{lm}(n))E_i^{lm}(n)\sum_{k=1}^{N} h_k^{lm}(n)$$

in which $\Delta w_{ij}$ is the change in the weight factor of the output of the ith first plurality neuron to the jth second plurality neuron from the last previous iteration to the current iteration; $\eta$ is a preselected learning factor; $K_c$ is a preselected positive controller gain which replaces the sensitivity function $$\frac{\partial y(n)}{\partial u(n)}$$

of said process; e is the error value for a given block; $q_j$ is the normalized output of the jth second plurality neuron; $E_i$ is the normalized delayed error value applied to the ith first plurality neurons of that block;

$$\sum_{k=1}^{N} h_k$$

is the sum of said second weight factors; (n) designates the current iteration; N is said first plurality; and l and m=1,2, . . . N with l≠m; and
   f) said second weight factor being continuously updated in successive iterations in said controller according to the formula $$\Delta h_j^{ll}(n) = \eta^{ll} K_c^{ll} e_l(n) q_j^{ll}(n)$$

and in said compensator according to the formula $$\Delta h_j^{lm}(n) = \eta^{lm} K_c^{lm} e_m(n) q_j^{lm}(n)$$

in which $\Delta h_j$ is the change in the weight factor of the output of the jth second plurality neuron to said third-layer neuron from the last previous iteration to the current iteration;
   g) each of said processes being controlled in accordance with a respective one of said process control input values.

20. The system of claim 19, in which the output of controller ll is $$v_{ll}(n) = K_c^{ll}\left[\sum_{j=1}^{N} h_j^{ll}(n) q_j^{ll}(n) + 1 + e_l(n)\right]$$

and the output of compensator lm is $$v_{lm}(n) = K_s^{lm} K_c^{lm}\left[\sum_{j=1}^{N} h_j^{lm}(n) q_j^{lm}(n) + 1\right]$$

wherein $K_s^{lm}$ is a sign factor which is 1 if processes ll and lm are of different acting types, and −1 if processes ll and lm are of the same acting type.

21. The system of claim 19, in which said controller gain is set at substantially regardless of the actual value of said sensitivity function.

22. A model-free adaptive cascade control system for an open-loop stable, controllable, and direct-acting or reverse-acting industrial process composed of a plurality of serially connected subprocesses with different control requirements, each subprocess having a subprocess input, a subprocess output which, except for the last subprocess of the series, is the subprocess input of the next subprocess in the series, and a sensitivity function which is the ratio of the partial derivatives with respect to time of said process output and said process input, comprising:
   a) means for measuring the output of the last subprocess in said series;
   b) a plurality of serially connected dynamic blocks, each except the first having as its input an error value input which is a function of the output of the previous block in the series, and of the measured output of one of said subprocesses, each said block having an output, the input of the first block in the series being an error value which is a function of said measured output of the last subprocess in the series and of a selected setpoint for the output of the last subprocess in the series, said dynamic blocks being arranged to iteratively, over a moving window of time, vary said dynamic block outputs to minimize said error values;

c) a control objective function in each of said dynamic blocks arranged to compute the error value associated with that block from the difference between the output of said one of said subprocesses and said previous block output or selected setpoint; and d) a learning mechanism arranged to continuously iteratively modify the parameters of said dynamic blocks to vary said block outputs so as to reduce all of said error values, said learning mechanism being based solely on said measured process outputs, and said block outputs and said setpoint; an arbitrary non-zero constant being substituted for the actual sensitivity function of each of said subprocesses in said learning mechanism;

d) each of said subprocesses being controlled in accordance with a said control value.

23. The system of claim 22, in which said arbitrary constant is 1.

24. A control system for processes having a process input, a measured process output, and a sensitivity function which is the ratio $$\frac{\partial y(t)}{\partial u(t)}$$

of the partial derivatives with respect to time of said process output and said process input, comprising;

a) a dynamic block having a single error value input and a control value output, said dynamic block being arranged to iteratively, over a moving window of time, vary said control value to minimize said error value;

b) said error value being the difference value between said measured process output and a selected setpoint;

c) a learning mechanism arranged to continuously iteratively modify the parameters of said dynamic block to vary said control value so as to reduce said error value based on said measured process output and said setpoint, an arbitrary function being substituted for the actual sensitivity function of said subsystem in said learning mechanism;

d) said process being controlled in accordance with said control value.

25. The controller of claim 24, in which said arbitrary function is substantially 1.

26. The controller of claim 24, in which said dynamic block is a neural network which has a plurality of successively time-delayed error value inputs.

27. A control system, comprising:

a) a process having at least one variable input, at least one output, and an unknown relationship between said input and said output;

b) a source of setpoint signals for defining a desired value of said output;

c) a controller connected to said setpoint signal source, said output and said input, said controller being arranged to so vary said input as to maintain said output at said desired value;

d) said controller including:
  i) a dynamic block having an error value input which is a function of the difference between said desired value and the actual value of said output, and producing a control value arranged to vary said variable input;
  ii) a control objective function arranged to compute said error value from said difference between said desired value and said output value;
  iii) a learning mechanism for said dynamic block, said learning mechanism being arranged to continuously iteratively modify the parameters of said dynamic block so as to vary said control value in a direction toward reducing said error value, said modification being based solely on minimizing said error value.

28. The system of claim 27, in which said error value is added to the output of said dynamic block to form said control value.

29. A method of controlling a plant having a variable input, an output, and an unknown relationship between said input and said output, without approximating or modeling said relationship, comprising the steps of:

a) selecting a setpoint representing a desired value of said output;

b) computing an error value which is a function of the difference between said setpoint and said output;

c) applying said error value as the sole input to a dynamic block whose inputs are time-delayed functions of said error value, and whose output is a control value which varies said plant input; and d) continuously iteratively varying the parameters of said dynamic block solely to minimize said error value.

30. The method of claim 29, further comprising the step of adding said error value to said control value.

* * * * *